(12) United States Patent
Kneckt et al.

(10) Patent No.: US 11,924,898 B2
(45) Date of Patent: *Mar. 5, 2024

(54) SYSTEM AND METHOD FOR MULTILINK DEVICES (MLDs)

(71) Applicant: Apple Inc., Cupertino, CA (US)

(72) Inventors: Jarkko L. Kneckt, Los Gatos, CA (US); Gaurav Jain, San Jose, CA (US); Yong Liu, Campbell, CA (US); Jinjing Jiang, San Jose, CA (US); Tianyu Wu, Cupertino, CA (US); Su Khiong Yong, Palo Alto, CA (US); Guoqing Li, Campbell, CA (US); Charles F. Dominguez, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/567,709

(22) Filed: Jan. 3, 2022

(65) Prior Publication Data

US 2022/0201785 A1    Jun. 23, 2022

Related U.S. Application Data

(63) Continuation of application No. 16/921,276, filed on Jul. 6, 2020, now Pat. No. 11,219,078.

(Continued)

(51) Int. Cl.
*H04W 76/15*    (2018.01)
*H04W 12/0471*  (2021.01)
(Continued)

(52) U.S. Cl.
CPC ....... *H04W 76/15* (2018.02); *H04W 12/0471* (2021.01); *H04W 48/16* (2013.01);
(Continued)

(58) Field of Classification Search
CPC . H04W 76/15; H04W 76/11; H04W 12/0471; H04W 48/16; H04W 80/02; H04W 84/12
(Continued)

(56) References Cited

U.S. PATENT DOCUMENTS 10,848,233 B2    11/2020  Vermani
11,219,078 B2 *   1/2022  Kneckt .................. H04W 12/04
(Continued)

FOREIGN PATENT DOCUMENTS

CN    101072237 A    11/2007
CN    102209036 A    10/2011
(Continued)

OTHER PUBLICATIONS

Extended European Search Report directed to related European Patent Application No. 20194074.9, dated Feb. 2, 2021; 10 pages.
(Continued)

*Primary Examiner* — Nghi H Ly
(74) *Attorney, Agent, or Firm* — Sterne, Kessler, Goldstein & Fox P.L.L.C.

(57) ABSTRACT

Some embodiments include utilizing a multilink media access control (MAC) address structure to support multilink devices (MLDs) that can operate concurrently in more than one link such as extremely high throughput (EHT) access points (APs) and EHT stations (STA), where the multilink MAC address structure is compatible with legacy devices. An EHT AP can utilize a multilink basic service set (BSS) identification (BSSID) MAC address to communicate with an EHT STA identified by a multilink MAC address. Values of the multilink BSSID and the multilink MAC address of the EHT STA are independent of which of the multiple links are used in the communication. In addition, to utilizing a multilink BSSID, the EHT AP can also support unique link-specific MAC addresses to concurrently support legacy
(Continued)

and MLD stations. The EHT STA can also utilize unique link-specific MAC addresses that can be different than the EHT AP's link-specific MAC addresses.

20 Claims, 18 Drawing Sheets

Related U.S. Application Data

(60) Provisional application No. 62/896,514, filed on Sep. 5, 2019.

(51) Int. Cl.
    *H04W 48/16*    (2009.01)
    *H04W 76/11*    (2018.01)
    *H04W 80/02*    (2009.01)
    *H04W 84/12*    (2009.01)

(52) U.S. Cl.
    CPC ............ *H04W 76/11* (2018.02); *H04W 80/02* (2013.01); *H04W 84/12* (2013.01)

(58) Field of Classification Search
    USPC ................ 370/329, 328, 338, 341, 345, 350
    See application file for complete search history.

(56) References Cited

U.S. PATENT DOCUMENTS

| | | |
|---|---|---|
| 2007/0288997 A1 | 12/2007 | Meier et al. |
| 2010/0332822 A1 | 12/2010 | Liu et al. |
| 2013/0058273 A1 | 3/2013 | Wentink et al. |
| 2016/0081006 A1 | 3/2016 | Reisslein et al. |
| 2016/0135053 A1 | 5/2016 | Lee et al. |
| 2019/0082373 A1 | 3/2019 | Patil et al. |
| 2019/0097850 A1 | 3/2019 | Kenney et al. |
| 2019/0150214 A1 | 5/2019 | Zhou et al. |
| 2019/0158385 A1 | 5/2019 | Patil et al. |
| 2019/0289612 A1 | 9/2019 | Chen et al. |
| 2019/0335454 A1 | 10/2019 | Huang et al. |
| 2021/0076437 A1 | 3/2021 | Kneckt et al. |

FOREIGN PATENT DOCUMENTS

| | | |
|---|---|---|
| CN | 103404187 A | 11/2013 |
| WO | WO 2019079256 A1 | 4/2019 |

OTHER PUBLICATIONS

3GPP TS 24.229, 3rd Generation Partnership Project; Technical Specification Group Core Network and Terminals; IP multimedia call control protocol based on Session Initiation Protocol (SIP) and Session Description Protocol (SDP); Stage 3 (Release 13), Sep. 22, 2017; 923 pages.

Chinese Office Action and Search Report directed to related Chinese Application No. 202010897492.4, with English-language translation of the Search Report, dated Jan. 4, 2024; 16 pages.

* cited by examiner

SYSTEM AND METHOD FOR MULTILINK DEVICES (MLDs)

CROSS-REFERENCE TO RELATED APPLICATIONS

This application claims priority to U.S. application Ser. No. 16/921,276, filed on Jul. 6, 2020, entitled, System and Method for Enhanced High Throughput (EHT) Stations, which claims benefit of U.S. Application No. 62/896,514, filed on Sep. 5, 2019, entitled, System and Method for Enhanced High Throughput (EHT) Stations, which are incorporated herein by reference in their entireties.

BACKGROUND

Field

The described embodiments relate generally to wireless communications.

Related Art

The Institute of Electrical and Electronics Engineers (IEEE) 802.11be specifies extremely high throughput (EHT) for wireless local area networks. EHT enables an EHT access point (AP) and an EHT station (STA) to utilize two or more radios for communications over multiple links.

SUMMARY

A multilink device (MLD) such as an extremely high throughput (EHT) access point (AP) can utilize two or more radios for communications over multiple links (e.g., radio channels in multiple frequency bands) for transmissions to one or more EHT stations (STAs). An EHT AP can also serve multiple basic service sets (BSSs) that can utilize the multiple links in which the EHT AP operates. In addition to supporting EHT STAs, an EHT AP supports legacy STAs that expect each BSS to have a unique BSS identification (BSSID) (e.g., a link-specific BSSID) so that discovered BSSs can be listed by BSSIDs.

Some embodiments include utilizing a BSSID structure that identifies an EHT AP, one or more BSSs that the EHT AP serves, and the multiple links in which the EHT AP operates. The BSSID structure includes a prefix address that identifies the EHT AP. The BSSID structure supports a multilink BSSID (e.g., $BSSID_{EHT}$) that uniquely identifies an EHT AP and a link-specific BSSID of a BSS of one or more BSSs that the EHT AP serves. EHT STAs that communicate with the EHT AP use the multilink BSSID to identify the EHT AP, invariant with respect to any of the multiple links in which the EHT AP operates. For example, an EHT STA transmitting to the EHT AP identifies the EHT AP using the multilink BSSID regardless of the link of the multiple links over which the EHT STA transmits to the EHT AP. In some embodiments, the multilink BSSID is used to identify the EHT AP in the transmissions to and from EHT STAs (e.g., when the EHT AP supports a single BSS). The BSSID structure can also support link-specific BSSIDs to identify each link of the multiple links in which the EHT AP operates (e.g., when the EHT AP supports one or more BSSs.) In some embodiments the multilink BSSID can be used in operations for pre-association and post-association in support of EHT communications.

Some embodiments include an apparatus, method, and computer program product for systematically identifying a multilink media access control (MAC) address with a BSSID structure that is backwards compatible with legacy stations. For example, the multilink MAC address enables extremely high throughput (EHT) communications between an EHT AP and EHT STAs that operate across multiple links. Some embodiments include an EHT AP that can operate in multiple links and communicate with an EHT STA via a link of the multiple links. To communicate, the EHT AP can transmit a first frame comprising a multilink BSSID, where the multilink BSSID identifies the EHT AP, and the multilink BSSID remains the same regardless of which link of the multiple links is used to transmit the first frame. The EHT AP can receive a second frame including the multilink BSSID and a multilink MAC address, where the multilink MAC address identifies the EHT STA, and where the multilink MAC address is invariant with respect to a link of the multiple links over which the second frame is received.

The EHT AP can transmit a beacon frame comprising a unique BSSID (e.g., a link-specific BSSID) that corresponds to a particular link of the multiple links, and receive, a third frame comprising the unique BSSID and a particular MAC address, where the particular MAC address identifies a legacy STA operating in the particular link.

In some embodiments, during pre-association, the EHT AP can derive a pairwise master key (PMK) using the multilink MAC address of the EHT STA and the multilink BSSID. During a 4-way handshake, the EHT AP can derive a pairwise transient key (PTK) using the multilink BSSID as a MAC address of the EHT AP, and the derived PMK. The EHT AP can utilize the derived PTK to encrypt a first unicast or robust management frame, and transmit the first encrypted unicast or robust management frame via a link of the multiple links. The EHT AP can also receive a second encrypted unicast or robust management frame via a link of the multiple links, and utilize the derived PTK to decrypt the second encrypted unicast or robust management frame. The EHT AP can also derive a group transient key (GTK) or integrity GTK (iGTK) using a link-specific BSSID, and transmit, via the one or more transceivers, the derived GTK or iGTK over a link of the multiple links.

In some embodiments the EHT AP can transmit indications of the multiple links, and in response to the transmit, receive a single authentication and association message from the EHT STA. The EHT AP can perform pre-association signaling over one link of the multiple links. For example, the EHT AP can perform pre-association signaling with the first EHT STA via a same link over which the single authentication and association message is received. The EHT AP can also receive an association request frame that indicates a second link of the multiple links over which the first EHT STA receives data during a post-association state. In some examples, the association request frame specifies a link-specific MAC address that the EHT STA uses for the second link, where the multilink MAC address is derivable from the link-specific MAC address.

In some examples, the EHT AP can be part of the first network and a second network, and can operate in the multiple links in the first network and the second network, and transmit a beacon frame. For the first network, the beacon can include: a BSSID structure including a prefix address of the EHT AP, a LinkId, and N bits that uniquely identify a BSS, where N is an integer. In some examples, a value of the multilink BSSID is invariant with respect to a link of the multiple links, and does not change based on which link of the multiple links is utilized for transmission or reception.

Some embodiments include an EHT STA that can operate in multiple links concurrently, and communicate with an EHT AP via a link of the multiple links. For example, in communicating, the EHT STA can receive a first frame comprising a multilink BSSID, where the multilink BSSID identifies the EHT AP and the multilink BSSID remains the same regardless of which link of the multiple links the first frame is received. The EHT STA can transmit a second frame including the multilink BSSID and a multilink MAC address, where the multilink MAC address identifies an EHT STA, and where the multilink MAC address is invariant with respect to a link of the multiple links over which the second frame is transmitted.

In some embodiments, the EHT STA can receive a beacon frame comprising a unique BSSID that corresponds to a particular link of the multiple links, and transmit a third frame comprising the unique BSSID and a particular MAC address, where the particular MAC address identifies the particular transceiver operating in the particular link. During pre-association, the EHT STA can derive a PMK using the multilink MAC address of the EHT STA and the multilink BSSID. During a 4-way handshake, the EHT STA can derive a PTK using the multilink MAC address as a MAC address of the EHT STA, and the derived PMK. In some embodiments, the EHT STA can receive a third frame including a link-specific BSSID that uniquely identifies a link over which the third frame is received, and derive the multilink BSSID from the link-specific BSSID.

Further embodiments, features, and advantages of the present disclosure, as well as the structure and operation of the various embodiments of the present disclosure, are described in detail below with reference to the accompanying drawings.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

Figure 1:
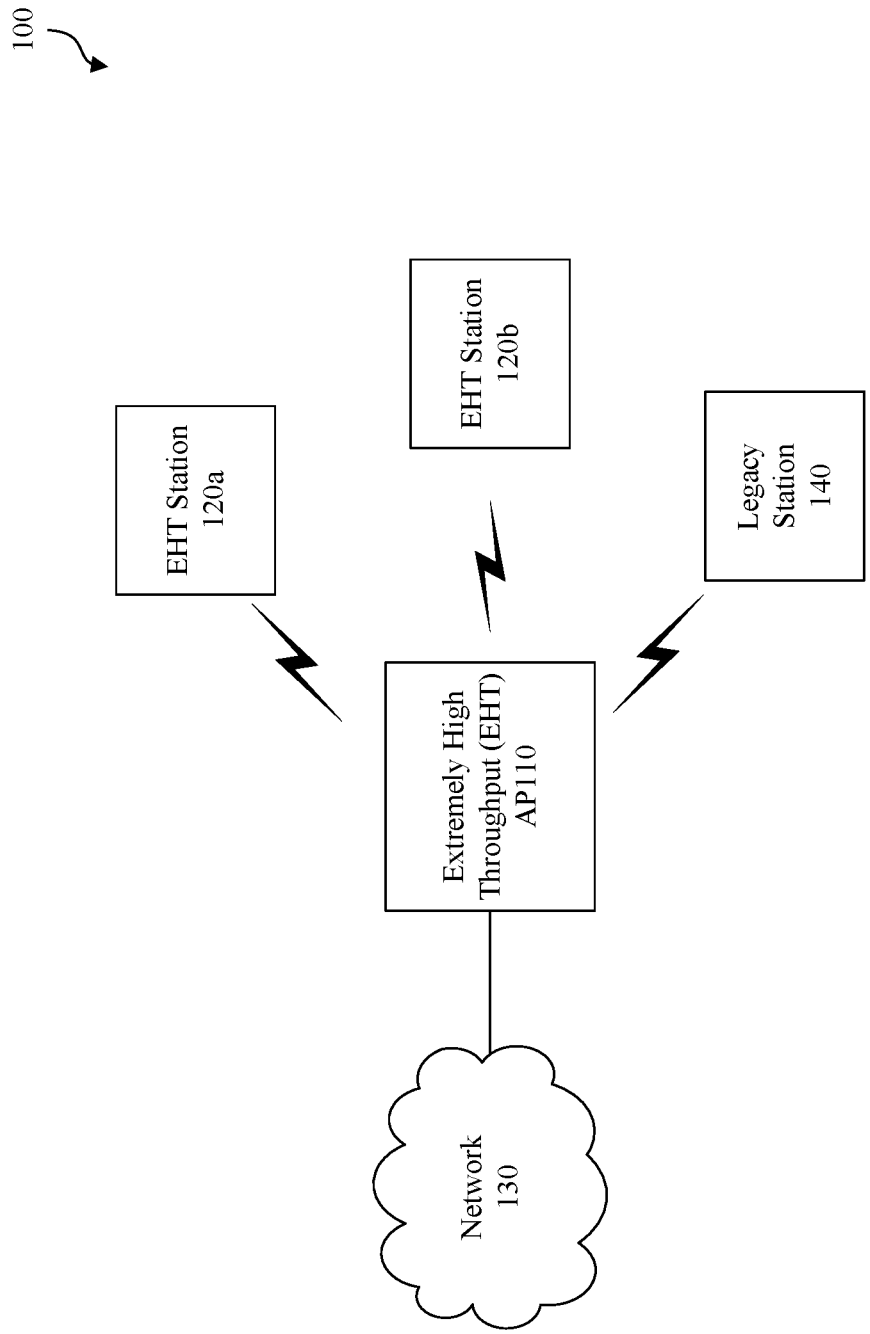
FIG. 1 illustrates electronic devices in a multilink device (MLD) environment (e.g., enhanced high throughput (EHT) environment), in accordance with some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some multilink devices (MLD) such as an extremely high throughput (EHT) access point (AP) can utilize one or more radios for communications over multiple links to an MLD station (e.g., EHT station (STA)). The multiple links can be multiple channels in a same frequency band or multiple channels in different frequency bands. Further, EHT AP can use a radio of the two or more radios to communicate with a legacy STA over a link.

FIG. 1 illustrates electronic devices in an MLD environment (e.g., EHT environment), in accordance with some embodiments of the disclosure. System 100 includes EHT AP 110 that provides EHT STAs 120a, 120b, and legacy STA 140 with access to network 130. EHT STAs 120 and legacy STA 140 are electronic devices that may include but are not limited to a cellular phone, a smart phone, a tablet, a personal digital assistant (PDA), or a laptop. Network 130 may include but is not limited to, any of or any combination of local area networks (LANs), metropolitan area networks (MANs), wireless local area networks (WLANs), and/or the Internet. EHT STAs 120 or legacy STA 140 in proximity to EHT AP 110 may associate with EHT AP 110.

Figure 5:
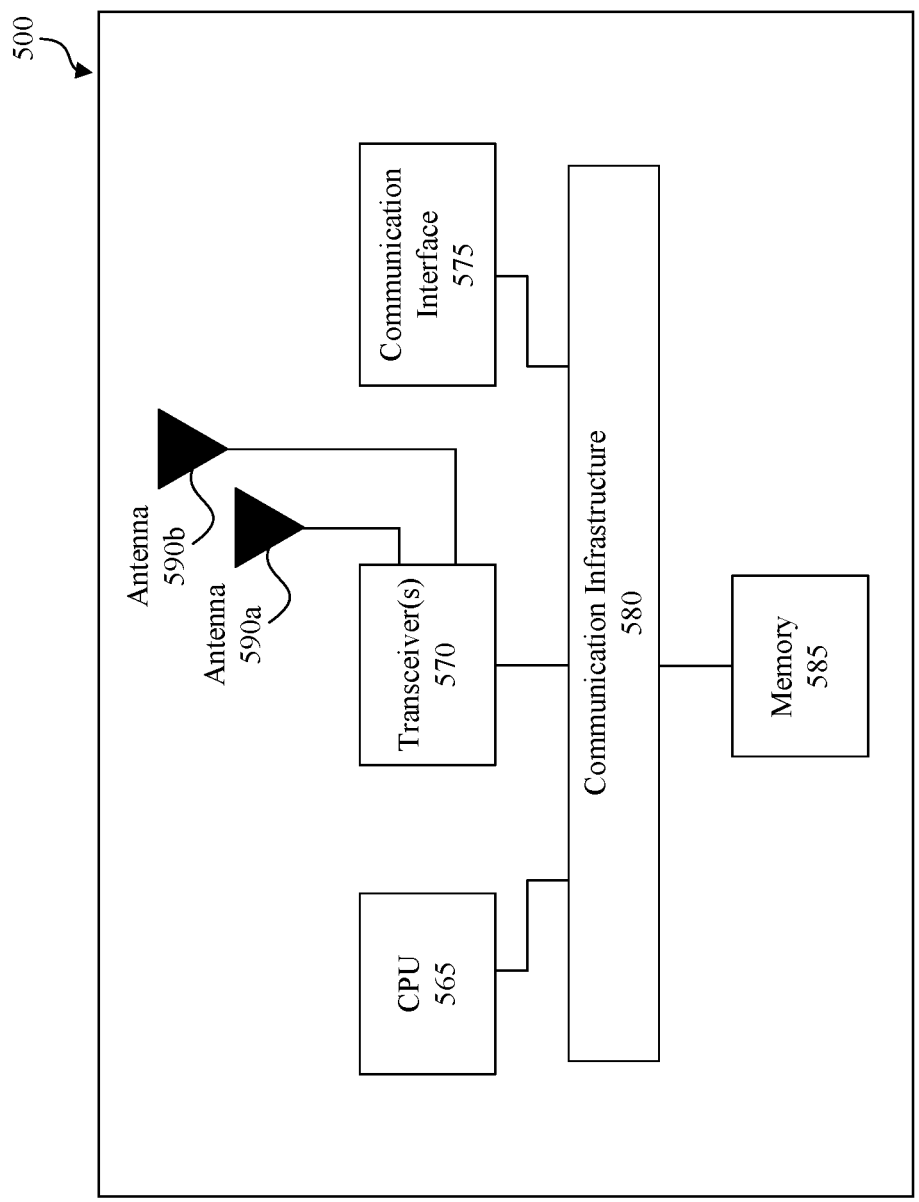
FIG. 5 illustrates a block diagram of a MLD (e.g., EHT wireless system), according to some embodiments of the disclosure.

FIG. 5 illustrates a block diagram of a MLD (e.g., EHT wireless system 500), according to some embodiments of the disclosure. For explanation purposes and not a limitation, FIG. 5 may be described with elements from FIG. 1. For example, system 500 may be any of the electronic devices (e.g., EHT AP 110, EHT STA 120, legacy STA 140) of system 100. System 500 includes central processing unit (CPU) 565, transceiver(s) 570, communication interface 575, communication infrastructure 580, memory 585, and antenna 590. Memory 585 may include random access memory (RAM) and/or cache, and may include control logic (e.g., computer instructions) and/or data. CPU 565 together with the instructions stored in memory 585 performs operations enabling the EHT wireless system 500 to transmit and receive EHT communications. Transceiver(s) 570 transmits and receives wireless communications signals including EHT communications according to some embodiments, and may be coupled to one or more antennas 590 (e.g., 590*a*, 590*b*). In some embodiments, a transceiver 570*a* (not shown) may be coupled to antenna 590*a* and different transceiver 570*b* (not shown) can be coupled to antenna 590*b*. Communication interface 575 allows system 500 to communicate with other devices that may be wired and/or wireless. Communication infrastructure 580 may be a bus. Antenna 590 may include one or more antennas that may be the same or different types.

Figure 2:
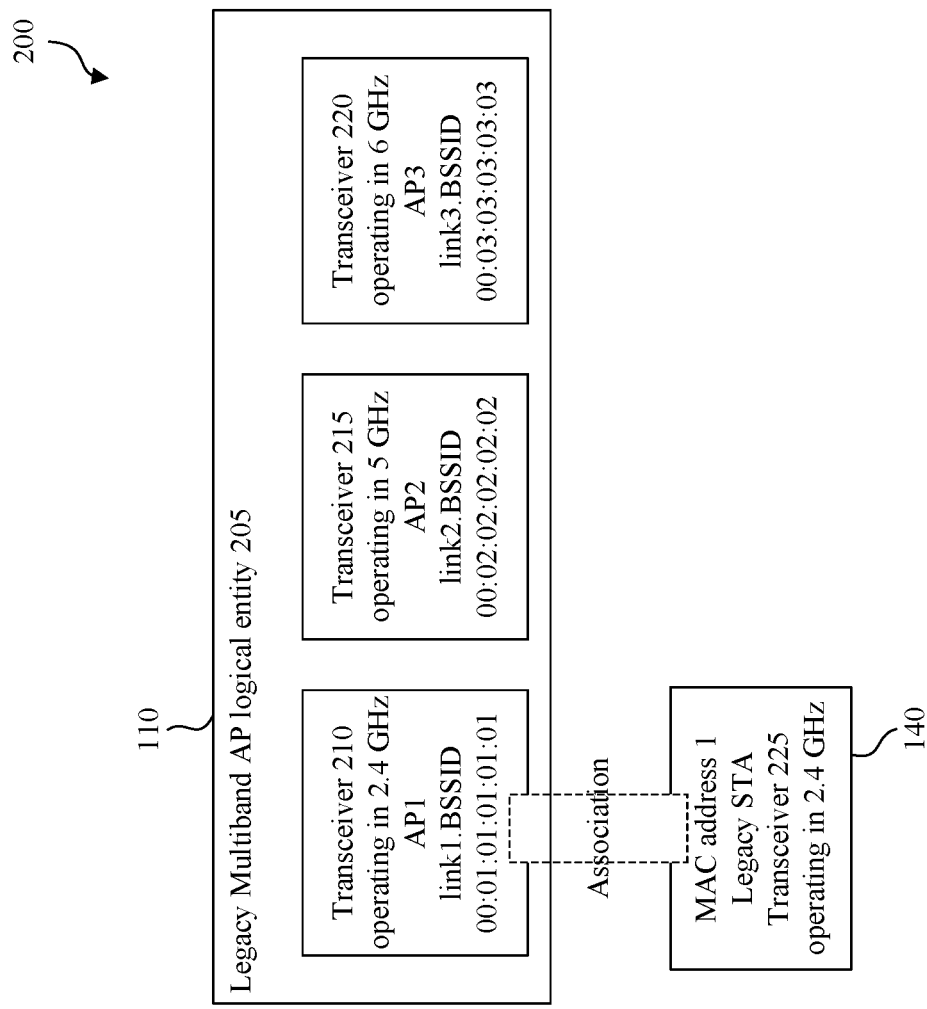
FIG. 2 illustrates a block diagram of a legacy multi-band access point (AP) and a legacy station using link-specific basic service set (BSS) identities (BSSIDs), in accordance with some embodiments of the disclosure.

FIG. 2 illustrates a block diagram 200 of a legacy multi-band AP 205 and a legacy STA 140 using link-specific basic service set (BSS) identities (BSSIDs), in accordance with some embodiments of the disclosure. For explanation purposes and not a limitation, FIG. 2 may be described with elements from FIG. 1. Legacy multi-band AP 205 can use a radio (e.g., a transceiver) of two or more radios to communicate with legacy STA 140 over a link. In block diagram 200, legacy multi-band AP 205 can operate in three links: 2.4 GHz, 5 GHz, and 6 GHz. The three radio transceivers are identified as transceiver 210, 215, and 220, and each transceiver operates independently from the other transceivers. Legacy stations require a unique BSSID per link. In other words, legacy stations require a link-specific BSSID. Thus, instead of seeing a single BSS with three different links, legacy STA 140 identifies three BSSs each with a unique link-specific BSS identification (BSSID) that corresponds to each link: link1.BSSID for 2.4 GHz; link2.BSSID for 5 GHz; and link3.BSSID for 6 GHz. Legacy STA 140 can associate to one of the BSSs at a time and utilizes transceiver 225. In block diagram 200, legacy STA 140 uses media access control (MAC) address 1 to establish an association with legacy multi-band AP 205 identified by a link-specific BSSID, link1.BSSID.

Figure 3:
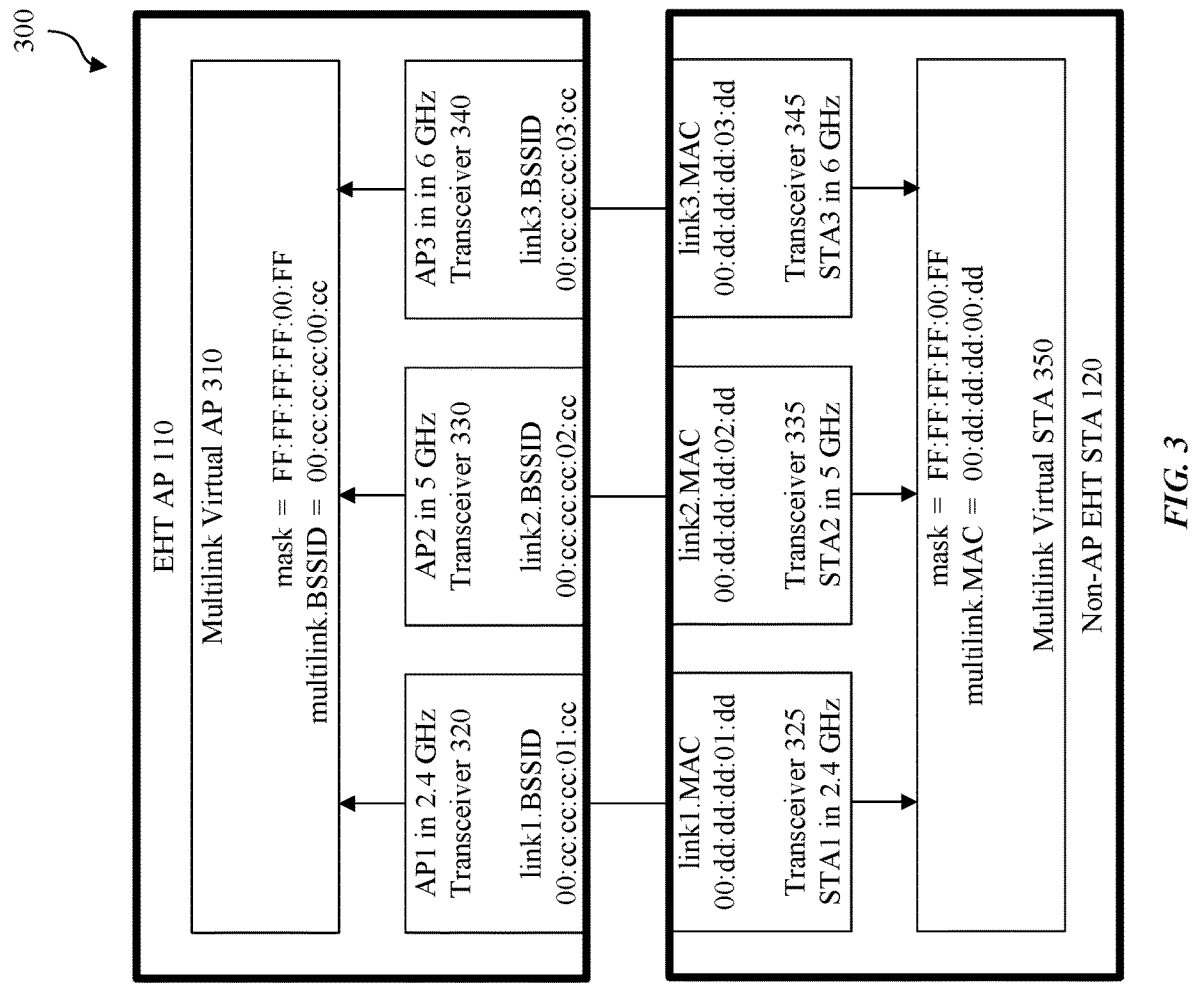
FIG. 3 illustrates a block diagram of a MLD AP (e.g., EHT AP) and a MLD station (e.g., EHT STA) supporting multilink BSSIDs, in accordance with some embodiments of the disclosure.

FIG. 3 illustrates a block diagram 300 of a MLD AP (e.g., EHT AP) and a MLD station (e.g., EHT STA) supporting multilink BSSIDs, in accordance with some embodiments of the disclosure. For explanation purposes and not a limitation, FIG. 3 may be described with elements from FIGS. 1 and 2. For example, EHT AP 110 includes multilink virtual AP 310 that can be identified by a multilink BSSID such as multilink.BSSID, that is present on all links (e.g., link1, link2, and link3) and each BSSID can include 6 octets. EHT AP 110 includes three APs, each identified by a link-specific BSSID of a physical link: AP1 in 2.4 GHz identified by link1.BSSID; AP2 in 5 GHz identified by link2.BSSID, and AP3 in 6 GHz identified by link3.BSSID. EHT AP 110 can utilize one or more radios (e.g., transceivers) to communicate over multiple links (e.g., over one or more frequency bands) to EHT STA 120 (e.g., EHT STA 120*a* or EHT STA 120*b* of FIG. 1). In block diagram 300, three radio transceivers are identified as transceiver 320, 330, and 340, and each transceiver operates independently from the other transceivers.

EHT STA 120 can include multilink virtual station 350 identified by a multilink MAC address, multilink.MAC, that can include 6 octets. EHT STA 120 also includes three stations that can be identified by a link-specific MAC addresses: Transceiver 325 for station 1 in 2.4 GHz identified by link1.MAC address; Transceiver 335 for station 2 in 5 GHz identified by link2.MAC address; and Transceiver 345 for station 3 in 6 GHz identified by link3.MAC address. The link-specific MAC addresses can include 6 octets.

EHT STA 120 and EHT AP 110 are MLDs and utilize multilink addresses in receiver address (RA) and transmitter address (TA) fields. For example, when EHT AP 110 transmits a message to EHT STA 120, EHT AP 110 utilizes the multilink.BSSID of multilink virtual AP 310 in the TA field and uses multilink.MAC address of multilink virtual STA 350 in the RA field. In contrast, legacy STA 140, non multilink-capable EHT stations, and non multilink-capable APs (not shown) use link-specific addresses (e.g., link1.BSSID, link1.MAC) in RA and TA fields. The structure of the multilink MAC addresses (e.g., multilink.BSSID and multilink.MAC) as well as link-specific MAC addresses (e.g., link1.BSSID, link1.MAC) are described below.

EHT STA 120 can scan and identify multilink virtual AP 310 identified by multilink.BSSID that is common across all three links. After associating with multilink virtual AP 310, EHT STA 120 can communicate via any links that are available in three different frequency bands: 2.4 GHz, 5 GHz, and 6 GHz. If one link is busy, EHT STA 120 or EHT AP 110 selects another link that is first available.

Figure 4:
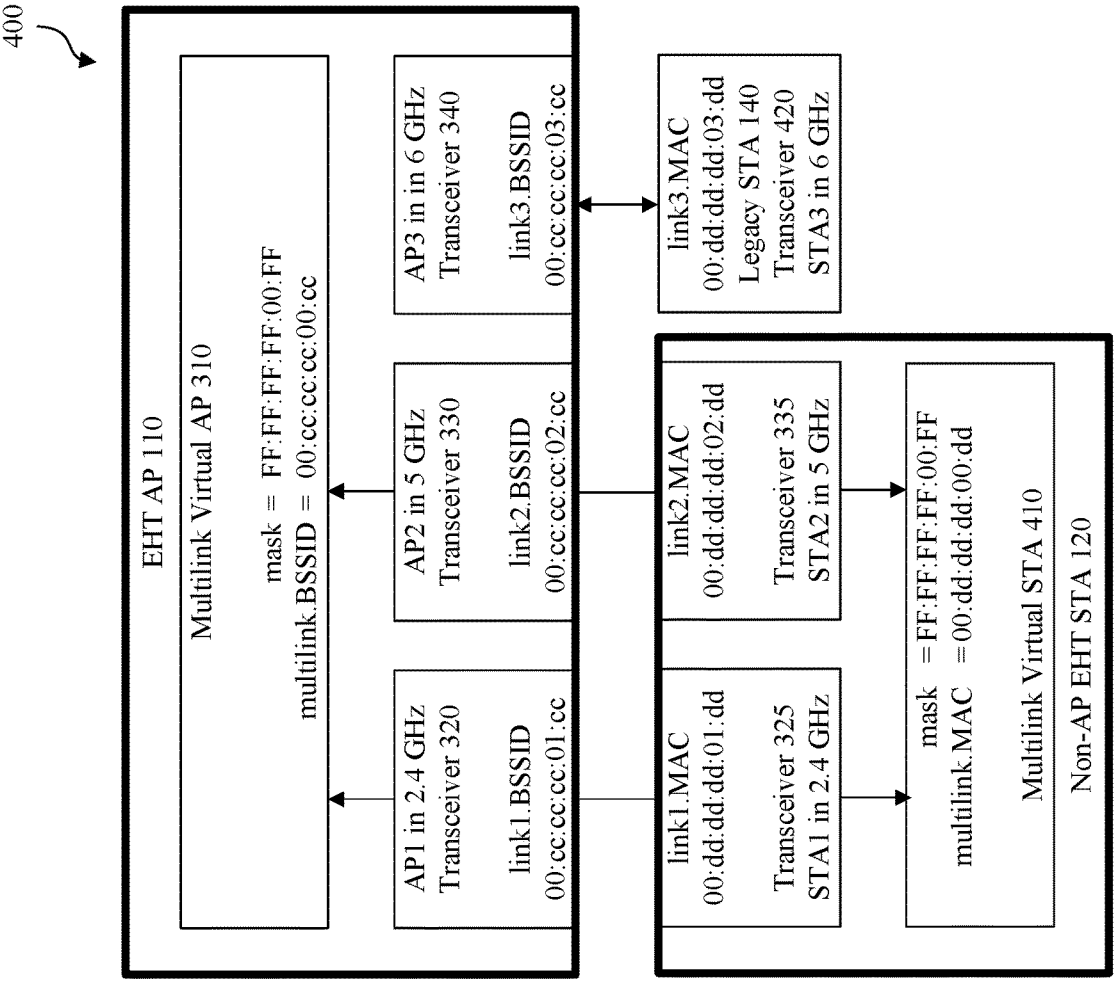
FIG. 4 illustrates a block diagram of a MLD AP (e.g., EHT AP) supporting legacy stations using link-specific BSSIDs and MLD stations (e.g., EHT STAs) using multilink BSSIDs, in accordance with some embodiments of the disclosure.

FIG. 4 illustrates a block diagram 400 of a MLD AP (e.g., EHT AP) supporting legacy stations using link-specific BSSIDs, and MLD stations (e.g., EHT STAs) using multilink BSSIDs, in accordance with some embodiments of the disclosure. For explanation purposes and not a limitation, FIG. 4 may be described with elements from FIGS. 1-3. For example, MLD AP (e.g., EHT AP 110) includes multilink virtual AP 310 that can be identified by a multilink BSSID such as multilink.BSSID. EHT AP 110 includes three APs, each identified by a link-specific BSSID: AP1 in 2.4 GHz identified by link1.BSSID; AP2 in 5 GHz identified by link2.BSSID, and AP3 in 6 GHz identified by link3.BSSID. Block diagram 400 also includes EHT STA 120 (e.g., EHT STA 120*a* or EHT STA 120*b*) and legacy STA 140 of FIG. 1. EHT STA 120 can include multilink virtual STA 410 identified by a multilink MAC address, multilink.MAC, that can include 6 octets. Non-AP EHT STA 120 connects to multilink virtual AP 310 (see long double-ended arrows) while legacy STA 140 connects to a link-specific AP (e.g., AP3 see short double-ended arrow.) Throughout the disclosure, EHT STA 120 can also be referred to as non-AP EHT STA 120.

EHT AP 110 can utilize one or more radios (e.g., transceivers) to communicate over multiple links (e.g., over one or more frequency bands) to EHT STA 120. In block diagram 400, three radio transceivers are identified as transceiver 320, 330, and 340, and each transceiver operates independently from the other transceivers. EHT STA 120 also includes two stations that can be identified by a link-specific MAC addresses: Transceiver 325 for station 1 in 2.4 GHz identified by link1.MAC address; transceiver 335 for station 2 in 5 GHz identified by link2.MAC address. Legacy STA 140 can be identified by a link-specific MAC address, transceiver 420 in 6 GHz identified by link3.MAC address. The link-specific MAC addresses can include 6 octets. As described above, EHT STA 120 and EHT AP 110 are MLDs and utilize multilink addresses in RA and TA fields. For example, when EHT AP 110 transmits a message to EHT STA 120, EHT AP 110 utilizes the multilink BSSID, multilink.BSSID, of multilink virtual AP 310 as the TA and uses the multilink MAC address, multilink.MAC, of multilink virtual STA 410 in the RA for transmissions in the 2.4 GHz and/or 5 GHz links. Likewise, when EHT STA 120 transmits to EHT AP 110 in 2.4 GHz and/or 5 GHz links, EHT STA 120 includes multilink.MAC address of multilink virtual STA 410 in the TA field and includes the multilink.BSSID of multilink virtual AP 310 in the RA field. Using the same multilink MAC address, multilink.MAC, of multilink virtual STA 410 and multilink BSSID, multilink.BSSID, of multilink virtual AP 310 for either of the two links for transmissions simplifies the individually addressed frames that are transmitted and/or retransmitted between EHT AP 110 and EHT STA 120.

In contrast, if an EHT STA 120 were to utilize the addressing scheme employed by legacy STA 140 as illustrated in block diagram 200 of FIG. 2, EHT STA 120 would utilize a different unique BSSID and MAC address on each link. For example, EHT STA 120 would use link1.BSSID and link1.MAC Address for transmissions on the 2.4 GHz frequency band. If the link on the 2.4 GHz frequency band became busy, EHT STA 120 would switch to a next available link on a different frequency band (e.g., 5 GHz) that utilizes a different unique BSSID, (e.g., link2.BSSID, and link2.MAC address) corresponding to the 5 GHz frequency band. EHT STA 120 would have to change from using link1.BSSID and link1.MAC Address, and instead utilize link2.BSSID and link2.MAC address to take advantage of available multiple links across the two frequency bands. Thus, using the same multilink MAC address, multilink-.MAC, of multilink virtual STA 410 and multilink BSSID, multilink.BSSID, of multilink virtual AP 310 for transmissions and retransmissions regardless of the 2.4 GHz or 5 GHz frequency band utilized is simpler and faster than utilizing the unique BSSID addressing schemes for each link (e.g., link-specific BSSIDs).

Legacy STA 140 is not a MLD and uses link-specific addresses. In this example, even though EHT AP 110 is a MLD, EHT AP 110 uses link-specific addresses rather than multilink addresses in the RA and TA fields. For example, when transmitting to legacy STA 140, EHT AP 110 uses link3.BSSID in the TA field and link3.MAC address in the RA field. In some examples, transceiver 420 can be included as part of EHT STA 120, even though transmissions utilize link-specific addresses and do not utilize multilink MAC addresses (e.g., multilink.MAC or multilink.BSSID.)

EHT STA 120 scans and identifies multilink virtual AP 310 identified by multilink.BSSID that is common across two links. After associating with multilink virtual AP 310, EHT STA 120 can communicate via any links that are available in two different frequency bands: 2.4 GHz and 6 GHz. If one link is busy, EHT STA 120 or EHT AP 110 selects another link that is first available. In contrast to identifying a multilink BSSID, legacy STA 140 scans and identifies three different APs based on respective link-specific BSSIDs: link1.BSSID, link2BSSID, or link3.BSSID. In block diagram 400, legacy STA 140 associates with AP3 in 6 GHz and transceiver 340. Thus, EHT AP 110 concurrently supports MLD stations such as EHT STA 120 and legacy STA 140. In other words, EHT AP 110 is backwards compatible with legacy STA 140 and utilizes a legacy BSSID structure, which is a unique BSSID, in beacon and probe response frame transmissions to and from legacy STA 140.

In some embodiments an MLD AP operates in multiple links and communicates, via a transceiver of the one or more transceivers, with a MLD STA via a link of the multiple links. Some embodiments include transmitting, via the one or more transceivers, a first frame comprising a multilink BSSID, where the multilink BSSID identifies the MLD AP, where the multilink BSSID is accepted over any of the multiple links and therefore is invariant with respect to any link of the multiple links over which the first frame is transmitted. In other words, the unique value multilink BSSID identifies the MLD AP and the unique value multilink BSSID does not change based on the link of the multiple links that are used to transmit MLD communications. Thus, the multilink BSSID is invariant with respect to any link of the multiple links used in MLD communications. In some examples, a multilink BSSID can be a $BSSID_{EHT}$. In some embodiments, the MLD AP receives, via one or more transceivers, a second frame comprising the multilink BSSID and a multilink MAC address, where the multilink MAC address identifies the MLD STA, and where the multilink MAC address is valid and accepted over any of the multiple links and therefore is invariant with respect to a link of the multiple links over which the second frame is transmitted.

For example, EHT AP 110 operates in multiple links (e.g., 2.4 GHz, 5 GHz, and 6 GHz) and communicates, via one or more transceivers (e.g., 3 transceivers) with EHT STA 120 via multiple links. Some embodiments include transmitting, via a transceiver (e.g., transceiver 320) of the one or more transceivers, a first frame comprising a multilink BSSID (e.g., multilink.BSSID of multilink virtual AP 310) where the multilink BSSID is invariant with respect to the link over which the first frame is transmitted; and receiving, via a transceiver (e.g., transceiver 330) of the one or more transceivers, a second frame that includes multilink.BSSID and a multilink MAC address (e.g., multilink.MAC of multilink virtual STA 410), where multilink.MAC identifies the first EHT STA (e.g., EHT STA 120), and where multilink.MAC address is invariant with respect to a link of the multiple links (e.g., link1 or link2) over which the second frame is received. In some embodiments, the same multilink.BSSID and same multilink.MAC address used for any and all of the multiple links for all transmissions and/or retransmissions between EHT AP 110 and EHT STA 120 can be employed during pre-association and post-association operations.

Figure 11:
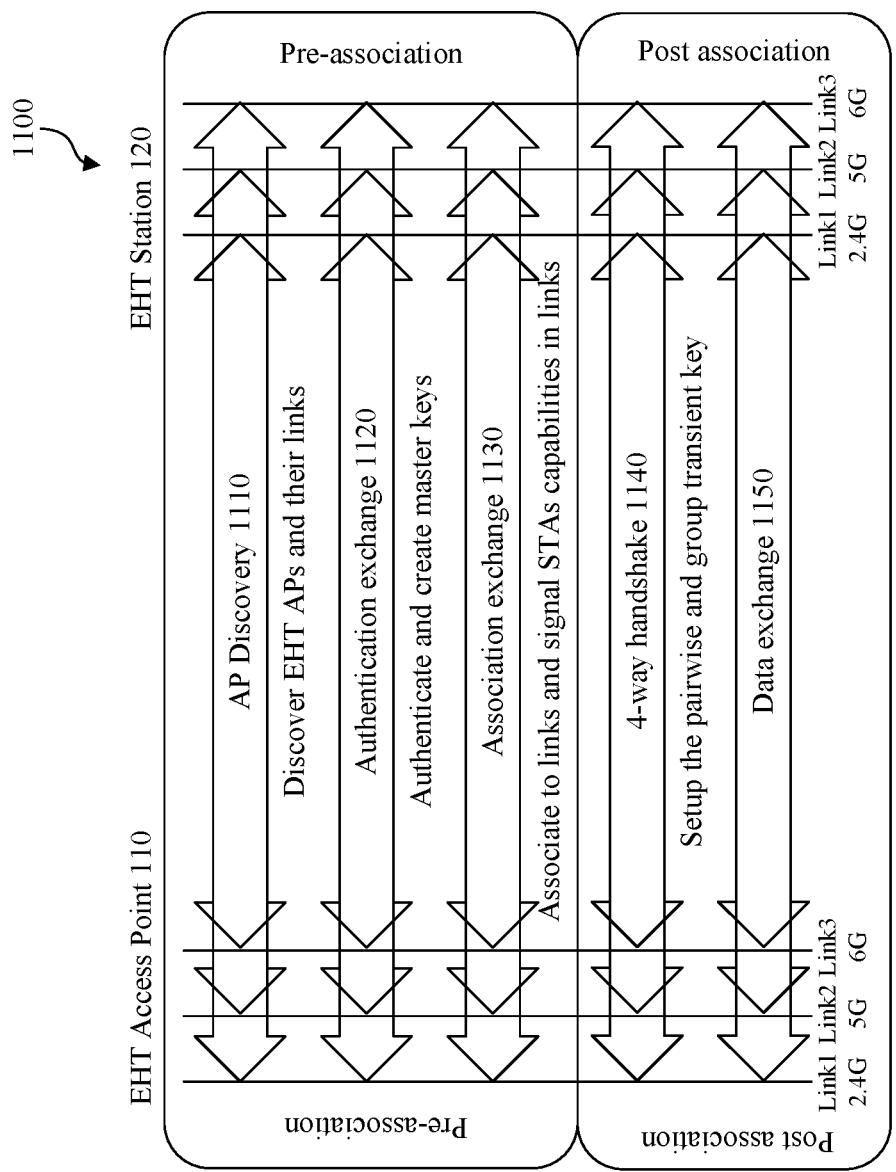
FIG. 11 illustrates pre-association and post-association operations, according to some embodiments of the disclosure.

FIG. 11 shows example 1100 of pre-association and post-association operations, according to some embodiments of the disclosure. For explanation purposes and not a limitation, FIG. 11 may be described with elements from other figures within this disclosure. Example 1100 includes pre-association processes: AP discovery 1110, authentication exchange 1120, and association exchange 1130. Post association processes can include: 4-way handshake 1140 and data exchange 1150.

An EHT STA (e.g., EHT STA 120) that has not authenticated and associated with an EHT AP (e.g., EHT AP 110) operates in a pre-associated state. EHT STA 120 can exchange a single authentication and association message over any link of the multiple links in which EHT AP 110 operates to initiate authentication and association with EHT AP 110. For example, EHT STA 120 discovers EHT AP 110 by receiving a probe request or a beacon from EHT AP 110. The probe request or beacon indicates the links (e.g., channels in frequency bands) in which EHT AP 110 operates. EHT STA 120 may initiate authentication and association with EHT AP 110 on any link of the multiple links as indicated in the probe request or beacon. The beacon and/or probe request frames can include reduced neighbor report (RNR) element that signals the channels, BSSIDs (e.g., link-specific BSSIDs), SSIDs, and EHT capabilities of various links in which EHT AP 110 operates. In some examples, an SSID can be a multilink BSSID that identifies an EHT AP.

Figure 10:
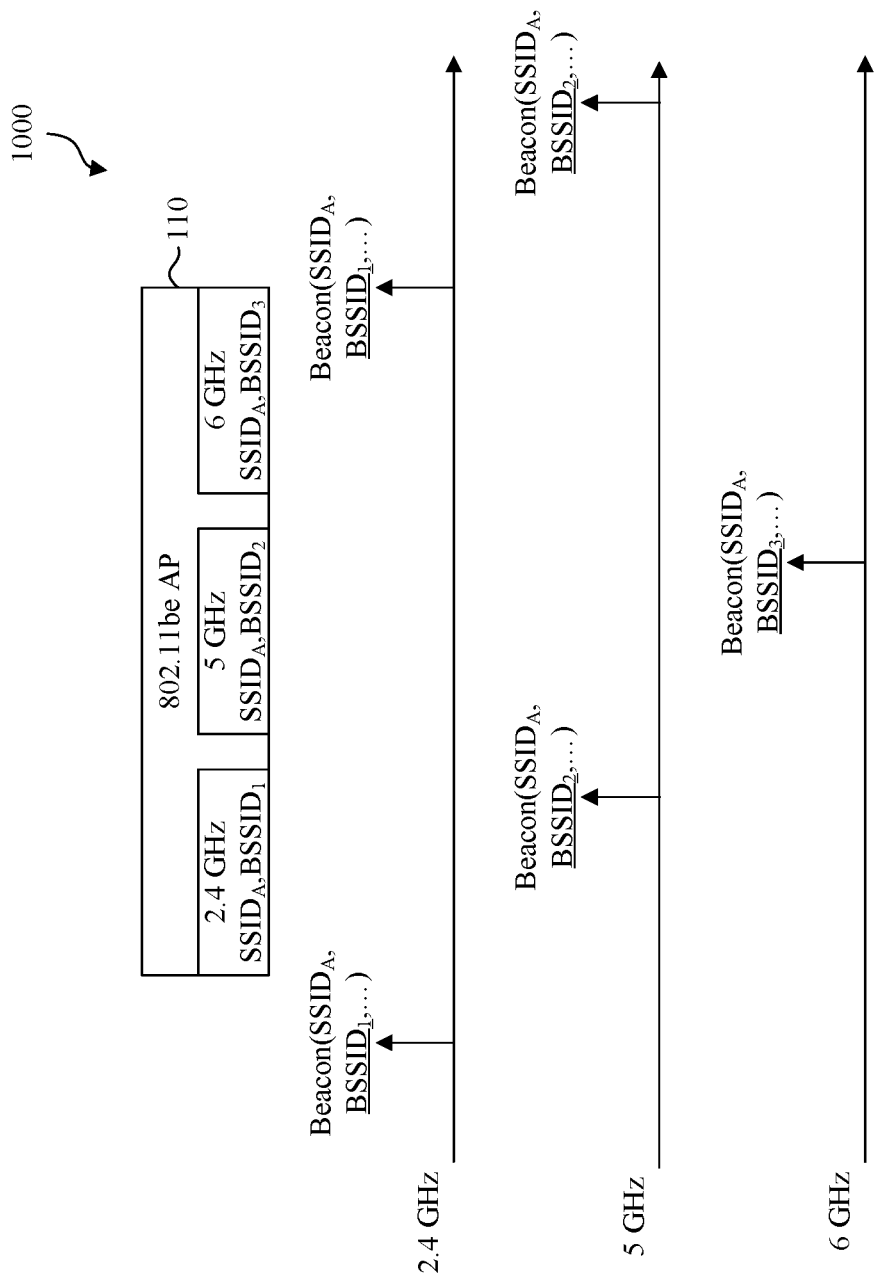
FIG. 10 illustrates an example of beacons with link-unique BSSIDs, in accordance with some embodiments of the disclosure.

FIG. 10 illustrates beaconing example 1000, in accordance with some embodiments of the disclosure. For explanation purposes, FIG. 10 may be described with elements from other figures in the disclosure. Example 1000 illustrates EHT AP 110, an IEEE 802.11be AP that can transmit beacons on the frequency bands in which EHT AP 110 operates. In this example there are three different frequency bands in which EHT AP 110 operates, and the beacon frames identify EHT AP 110 within the service set identification (SSIDA) and unique BSSIDs to meet expectations of legacy electronic devices like legacy STA 140. In other words, SSIDA can be a multilink BSSID and the unique BSSID can be a link-specific BSSID (e.g., $BSSID_1$, $BSSID_2$, $BSSID_3$) For example, EHT AP 110 periodically transmits a beacon frame on the 2.4 GHz frequency band that includes SSIDA with unique $BSSID_1$ that is specific to the 2.4 GHz link. EHT AP 110 periodically transmits a beacon frame on the 5 GHz frequency band that includes SSIDA with unique $BSSID_2$ that is specific to the 5 GHz link. And EHT AP 110 periodically transmits a beacon frame on the 6 GHz frequency band that includes SSIDA with unique $BSSID_3$ that is specific to the 6 GHz link. Legacy STA 140 can listen for the appropriate beacon frame based on the frequency on which legacy STA 140 operates and respond with a probe response that includes a MAC address of legacy STA 140 as well as the corresponding link-specific unique BSSID. For example, legacy STA 140 can listen for $BSSID_1$ on the 2.4 GHz frequency, which is consistent with legacy STA 140's transceiver operating frequency.

In some embodiments, the EHT AP transmits via a transceiver, indications of the multiple links. In response to the transmission, the EHT AP receives via a transceiver, a single authentication and association message from the EHT STA and performs the following: i) EHT AP performs pre-association signaling over one link of the multiple links at least based on the single authentication and association message received; ii) when the single authentication and association message includes a second and third link of the one or more links, the EHT AP performs pre-association signaling with the first EHT STA via the second or third link; or iii) the EHT AP performs pre-association signaling with the first EHT STA via a same link over which the single authentication and association message is received from the first EHT STA.

For example, EHT AP 110 can transmit via a transceiver, one or more indications of the multiple links in which EHT AP 110 operates. In response to the transmission, EHT AP 110 receives via a transceiver, a single authentication and association message from EHT STA 120 and performs the following: i) EHT AP 110 can perform (e.g., transmit and receive) pre-association signaling over any one link of the multiple links based on the single authentication and association message received; ii) when the single authentication and association message from EHT STA 120 includes a second and third link of the multiple links, EHT AP 110 can perform pre-association signaling with EHT STA 120 via the second or third link; or iii) EHT AP 110 can perform pre-association signaling with EHT STA 120 via a same link over which the single authentication and association message is received from EHT STA 120. In an embodiment, the pre-association signaling occurs over a single link (e.g., 2.4 GHz, 5 GHz, or 6 GHz which can include a channel within a frequency band) for each of the AP discovery 1110, authentication exchange 1120, and association exchange 1130. For example, EHT AP 110 can utilize link1 in the 2.4 GHz frequency band for the pre-association processes with EHT station 120. In another example, For example, EHT AP 110 can utilize link2 in the 5 GHz frequency band for the pre-association processes with EHT station 120. In another example, EHT AP 110 can utilize link3 in the 6 GHz frequency band for the pre-association processes with EHT station 120.

Figure 12:
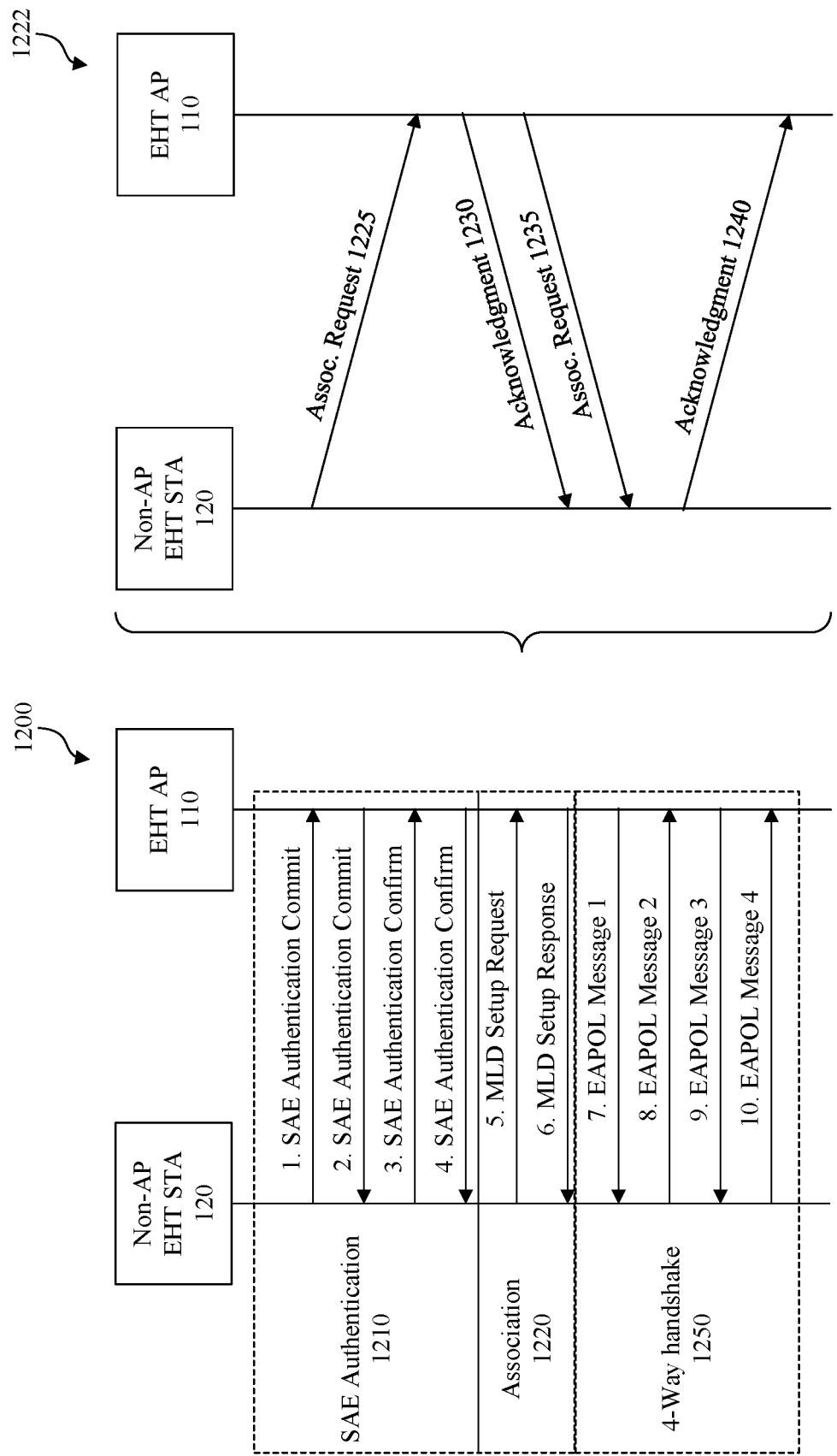
FIG. 12 illustrates an example of some pre-association and post association operations supporting MLDs, according to some embodiments of the disclosure.

FIG. 12 illustrates an example 1200 of some pre-association and post association operations supporting MLDs, according to some embodiments of the disclosure. For example, authentication mechanisms such as Simultaneous Authentication of Equals (SAE) authentication 1210 depends on MAC addresses to identify STAs and APs that are then used along with cryptographic material during protocol exchange to derive a pairwise master key (PMK). In some embodiments, an EHT STA uses a multilink MAC address to identify the EHT STA for certain links and corresponding frequency bands used by the EHT AP. Further, an EHT STA uses a multilink BSSID to identify the MAC address of the EHT AP. In an example, EHT STA 120 can use multilink.MAC address in the TA field to identify EHT STA 120 as the transmitter of frames to EHT AP 110 via links in the 2.4 GHz and/or 5 GHz frequency bands as shown in FIG. 4, and multilink.BSSID in the RA field to identify the MAC address of EHT AP 110 as the receiver. Further, legacy STA 140 can use a unique and link-specific address such as link3.BSSID in the RA field for transmissions across the 6 GHz link to EHT AP 110 that receives the transmission, and a unique and link-specific MAC address such as link3.MAC address in the TA field to identify legacy STA 140 as the transmitter.

In some embodiments, during pre-association, an EHT AP can derive a PMK using the multilink MAC address of the EHT STA and the multilink BSSID of the EHT AP as the EHT AP's MAC address. For example, EHT AP 110 can derive a PMK using multilink.MAC of EHT STA 120, and multilink.BSSID of EHT AP 110. Likewise, EHT STA 120 can derive a PMK using multilink.MAC of EHT STA 120 and multilink.BSSID of EHT AP 110.

Association processes 1220 of FIG. 12 include a non-AP EHT STA 120 transmitting a MLD setup request to EHT AP 110. EHT AP 110 subsequently transmits a MLD setup response to non-AP EHT STA 120. In some embodiments association 1220 occurs via a single link. In some embodiments, the single link is the same link over which SAE authentication 1210 and 4-way handshake 1250 occurs. This exchange is further described in example 1222. In some embodiments, EHT AP 110 receives via a transceiver, an association request frame 1225 that includes: a non-AP STA MAC address for each link and optionally the multilink MAC address, the non-AP STA capabilities for each frequency band, and/or the non-AP STA operating parameters for each link. For example, capability elements such as high throughput (HT), very HT (VHT), high efficiency (HE), 6 GHz band HE, and EHT capability elements indicate the link in which an EHT STA can operate. Further, operating mode indication (OMI) signaling with data frames or power save signaling can determine which links are turned on and/or off. For example, the determination can be based on BW, Number of Spacial Streams (NSS), VHT, EHT, etc. In response, EHT AP 110 transmits acknowledgment 1230.

Subsequently, EHT AP 110 transmits association request frame 1235 that includes: success indication (e.g., whether EHT AP 110 allows non-AP EHT STA to associate. EHT AP 110 may allow non-AP EHT STA 120 to operate only in selected links); link-specific BSSIDs for each link and the multilink BSSID value (e.g., $BSSID_{EHT}$ value); EHT AP capabilities for each frequency band; and/or EHT AP operating parameters for each link (for example, there may be more than one link in a same frequency band.) In response, non-AP EHT STA 120 transmits acknowledgement 1240.

After successful association, non-AP EHT STA 120 has associated to one or more links configured capabilities for the frequency bands, and configured operating parameters for each link.

The 4-way handshake 1250 of FIG. 12 shows the exchange of Extensible Authentication Protocol (EAP) over local area network (LAN) (EAPOL) messages used to derive transient keys. For example, the derived PMK can be used to derive a pairwise transient key (PTK) and/or group transient key (GTK). The PTK and GTK can be used in a single 4-way handshake during pre-association. In some embodiments, an EHT AP utilizes the derived PTK to encrypt a first unicast or robust management frame, and transmit via a transceiver, the first encrypted unicast or robust management frame via a link of the multiple links. An EHT AP also receives via a transceiver, a second encrypted unicast or robust management frame via a link of the one or more links; and utilizes the derived PTK to decrypt the second encrypted unicast or robust management frame. For example, EHT AP 110 utilizes the derived PTK to encrypt a first unicast or robust management frame, and transmit via a transceiver, the first encrypted unicast or robust management frame via a link of the multiple links to EHT STA 120. EHT AP 110 receives via a transceiver, a second encrypted unicast or robust management frame via a link of the one or more links; and utilizes the derived PTK to decrypt the second encrypted unicast or robust management frame.

In some embodiments an EHT AP derives a GTK or integrity GTK (iGTK) using the multilink BSSID; and transmits via a transceiver, the derived GTK or iGTK over a link of the multiple links. For example, EHT AP 110 can derive a GTK or iGTK using the multilink BSSID; and transmit, via a transceiver, the derived GTK or iGTK over a link of the multiple links. An EHT STA that is associated with the EHT AP can receive and decrypt the group addressed frames transmitted by the associated EHT AP on any link using the same GTK or iGTK. Group addressed frames can be received by all EHT STA 120 associated with EHT AP 110. For example, EHT STA 120 associated with EHT AP 110 can receive and decrypt group addressed frames received via a transceiver from EHT AP 110 on any link over the multiple links in which EHT AP 110 operates (e.g., 2.4 GHz, 5 GHz, and 6 GHz in this example) EHT STA 120 can use the same GTK or iGTK to decrypt group addressed frames received over a link in the 5 GHz frequency band as well as group addressed frames received over a link in the 6 GHz frequency band.

An EHT AP (e.g., EHT AP 110) transmits group addressed frames at least once in each link. If one or more legacy STAs (e.g., legacy STA 140) have associated to a link, then the EHT AP transmits the group addressed frames to the legacy STAs over that link using legacy (e.g., non-HT or non-EHT) physical layer conformance procedure (PLCP) protocol data units (PPDUs) (e.g., a Transmitter Address (TA) may be set to a link-specific BSSID.) Each of the BSSIDs may have a unique GTK (e.g., each link may use a different GTK.) If a given link only has EHT STAs (e.g., EHT STA 120) associated with the EHT AP, then the EHT AP may transmit group addressed frames using EHT PPDUs over the given link.

In some embodiments, the EHT AP transmits group addressed frames over at least one link of the multiple links in which the EHT AP operates to ensure that associated EHT STAs can receive group addressed frames. This avoids the EHT AP having to send group addressed frames over more links than necessary. In some embodiments the 4-way handshake can be via one link. In some embodiments, the 4-way handshake can utilize more than one link.

In some embodiments, each AP within an EHT AP and/or the EHT AP can derive a GTK and/or iGTK based on a link-specific BSSID and thus, each AP can have a different link-specific GTK and/or link-specific iGTK for each link. In some examples, the link-specific GTK and/or link-specific iGTKs are shared among the APs within an EHT AP so that an AP operating in 5 GHz that receives a group addressed frame that is encrypted using a 6 GHz link-specific GTK and/or 6 GHz link-specific iGTK can access the 6 GHz link-specific GTK and/or 6 GHz link-specific iGTK to decrypt the group addressed frame.

Figure 13:
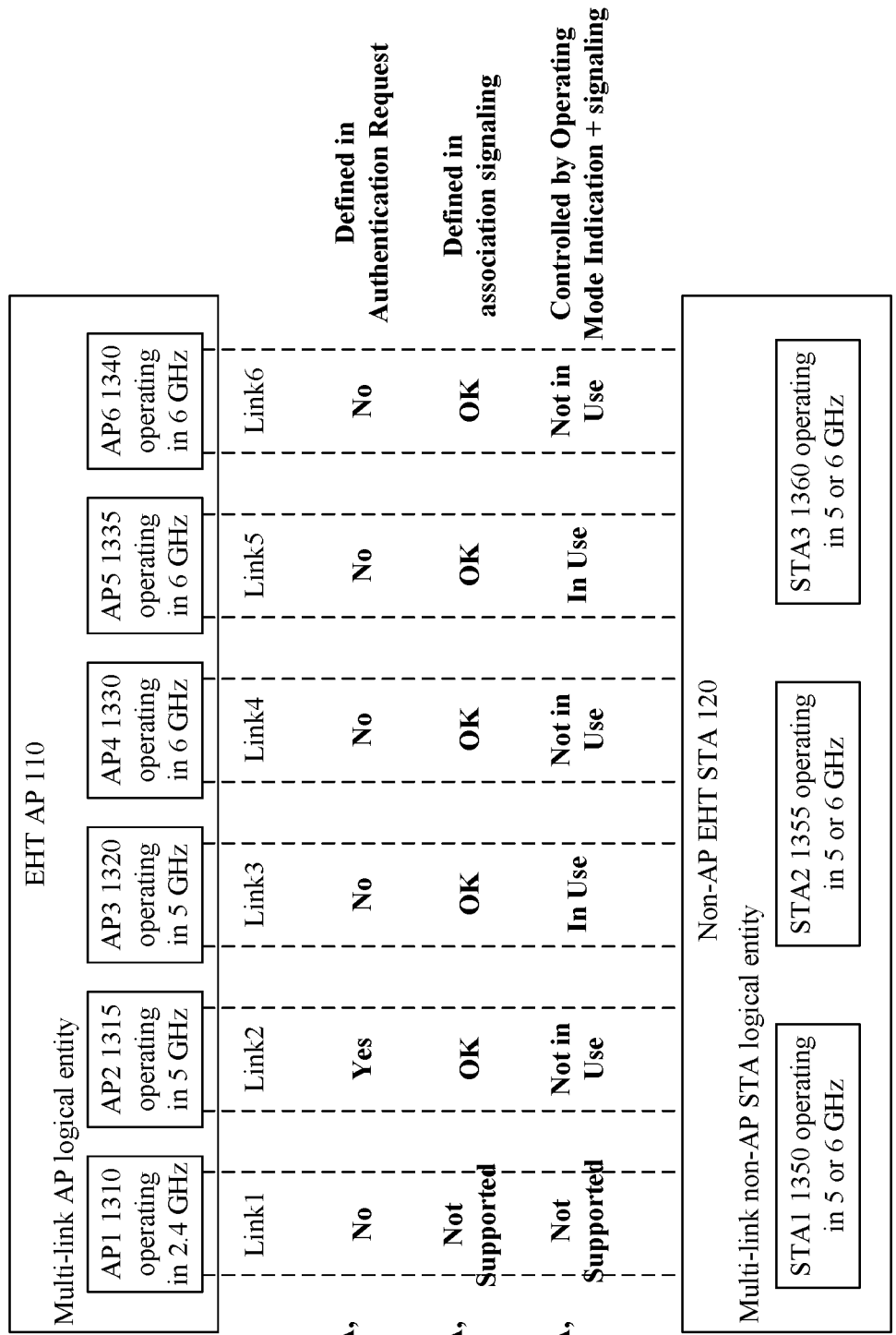
FIG. 13 illustrates an example of pre-association and post association operations, according to some embodiments of the disclosure.

FIG. 13 illustrates an example of pre-association and post association operations, according to some embodiments of the disclosure. For explanation purposes and not a limitation, FIG. 13 may be described with elements from other figures in the disclosure. In a post-association state, EHT STA (e.g., EHT STA 120) can utilize the multiple links in which the EHT AP (e.g., EHT AP 110) operates. In other words, the EHT STA can operate in the links of an EHT BSS in which the EHT STA is capable of operating. For example, capability elements such as HT, VHT, HE, 6 GHz band HE, and EHT capability elements indicate the link in which an EHT STA can operate. The links that the EHT STA utilizes in a post-association state may be different from the links used in the pre-association state. For example, the links that the EHT STA indicated were available for use during the pre-association state may be a superset of links that the EHT STA chooses to utilize in a post-association state.

As described above, association request frame 1225 can include non-AP EHT STA 120 capabilities to operate in different channels. The non-AP EHT STA 120 may be capable to operate in multiple frequency bands. The EHT AP 110 may operate multiple BSSs or multiple links in a frequency band. The EHT AP 110 may have higher number of radios than the non-AP EHT STA 120 and EHT AP 110 may have larger number of BSSs (e.g., networks) operating in a band. In example 1300, EHT AP 110 can include six APs with 6 different links operating in three different frequency bands. Non-AP EHT STA 120 can discover EHT AP 110, and establish more links than what non-AP EHT STA 120 has radios and thus, non-AP EHT STA 120 may not able to concurrently operate in all associated links. Non-AP EHT STA 120 may control the number of the links and the links in which it operates. For example, the association request frame 1225 may include an enhanced OMI+ element that indicates the configuration of the links over which non-AP EHT STA 120 is available to receive data in a post-association state. For example, EHT AP 110 may operate link1 at 2.4 GHz, link2 and link 3 at 5 GHz, and three links at 6 GHz: Link4, link5, and link6. Non-AP EHT STA 120 may be capable of operating in the 5 GHz and 6 GHz bands, but not the 2.4 GHz band. During the pre-association state, non-AP EHT STA 120 may transmit all association and authentication signaling over the link2 in the 5 GHz link and associate to 5 links (e.g., 5 BSS networks) over two frequency bands. For example, in the post-association state, non-AP EHT STA 120 has 3 radios and can choose up to 3 links in which operate for a desired performance. For example, non-AP EHT STA 120 can operate on up to 3 links among the following: link2 and link3 at 5 GHz (e.g., respectively, primary channel at ch. 36 and 149), and Link4, link5, and link6 at the 6 GHz band. Of note, the same encryption keys (e.g., PMK and PTK) are used in all the links (e.g., regardless of which link is utilized.) In some embodiments, non-AP EHT STA 120 can change to operate only in the link3 with ch. 149 at the 5 GHz band and link5 at the 6 GHz band. This reduction of the number of links being used enables non-AP EHT STA 120 to reduce power expenditure that is especially important for battery-operated devices. Larger number of created or enabled links (e.g., 5 links in this example) allows non-AP EHT STA 120 to change to the links that can enable a desired performance. This may be beneficial, to avoid interference and to select the best channel for non-AP EHT STA 120 operations.

Figure 6:
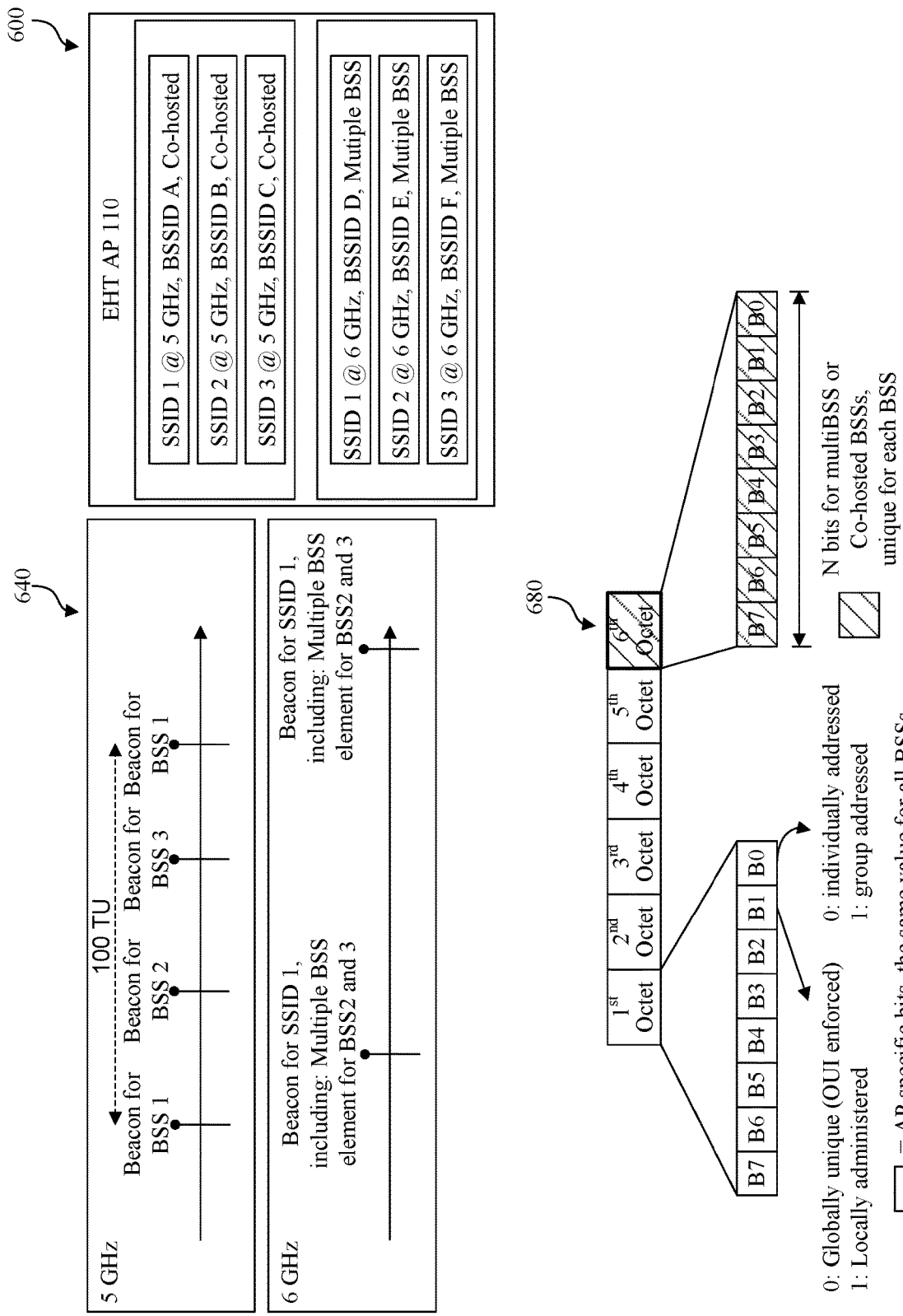
FIG. 6 illustrates beaconing and BSSID structures for multi-BSS and co-hosted BSSs, according to some embodiments of the disclosure.

FIG. 6 illustrates diagrams including an AP 600, beaconing diagram 640, and BSSID structure 680 in a multiple BSS environment, in accordance with some embodiments of the disclosure. For explanation purposes and not a limitation, FIG. 6 may be described with elements from other figures in this disclosure. In this example, AP 600 (e.g., EHT AP 110) can be a part of multiple networks such as office network SSID1, home network SSID2, and gaming network SSID3. Each network can be identified by a service set ID (SSID) which can be a network name (e.g., office network.) Each network can include multiple BSSs. for example, SSID1 can be an office network with a BSS in the 5 GHz frequency band and a BSS in the 6 GHz frequency band. Accordingly, EHT AP 110 can support two links for SSID1, one in the 5 GHz and another in the 6 GHz frequency band. As explained below, BSSID structure 680 results in a unique BSSID for each BSS, and does not distinguish between different links of the multiple links in which AP 600 operates.

AP 600 may be configured to operate the three networks as co-hosted or multi-BSSs operations as shown in beaconing diagram 640. As shown in the 5 GHz link, AP 600 co-hosts the networks and transmits three beacon and probe response frames, each beacon and probe response frame being specific to one of the 3 networks within a time unit (TU.) As shown in the 6 GHz link, AP 600 demonstrates multi-BSS operations and transmits one beacon and probe response frame for all the networks, from a single network's perspective (e.g., SSID1) that includes the information elements of the remaining non-transmitting networks (e.g., SSID2 and SSID3.)

Based on AP 600, legacy STA 140 when scanning, can identify six different BSSs (e.g., 3 networks*2 links: 5 GHz and 6 GHz.) EHT STA 120, when scanning, can identify three multilink SSIDs (e.g., 3 networks) where each network operates in 5 GHz and 6 GHz links, and data can be exchanged on both links on three networks at the same time. BSSID structure 680 illustrates the structure of BSSIDs of co-hosted BSSs and multi-BSS arrangements that accommodates the structure that legacy STA 140 expects: The clear octets, 1$^{st}$ Octet-5$^{th}$ Octet, make up a common prefix that identifies AP 600. All BSSIDs transmitted by the EHT AP have the same value for these 5 octets. The wide-stripe patterned octet, 6$^{th}$ Octet, is a postfix that uniquely identifies each BSS. But, BSSID structure 680 lacks the structure that EHT STA 120 needs, namely the ability to distinguish between different links of the multiple links in which AP 600 operates.

Figure 7:
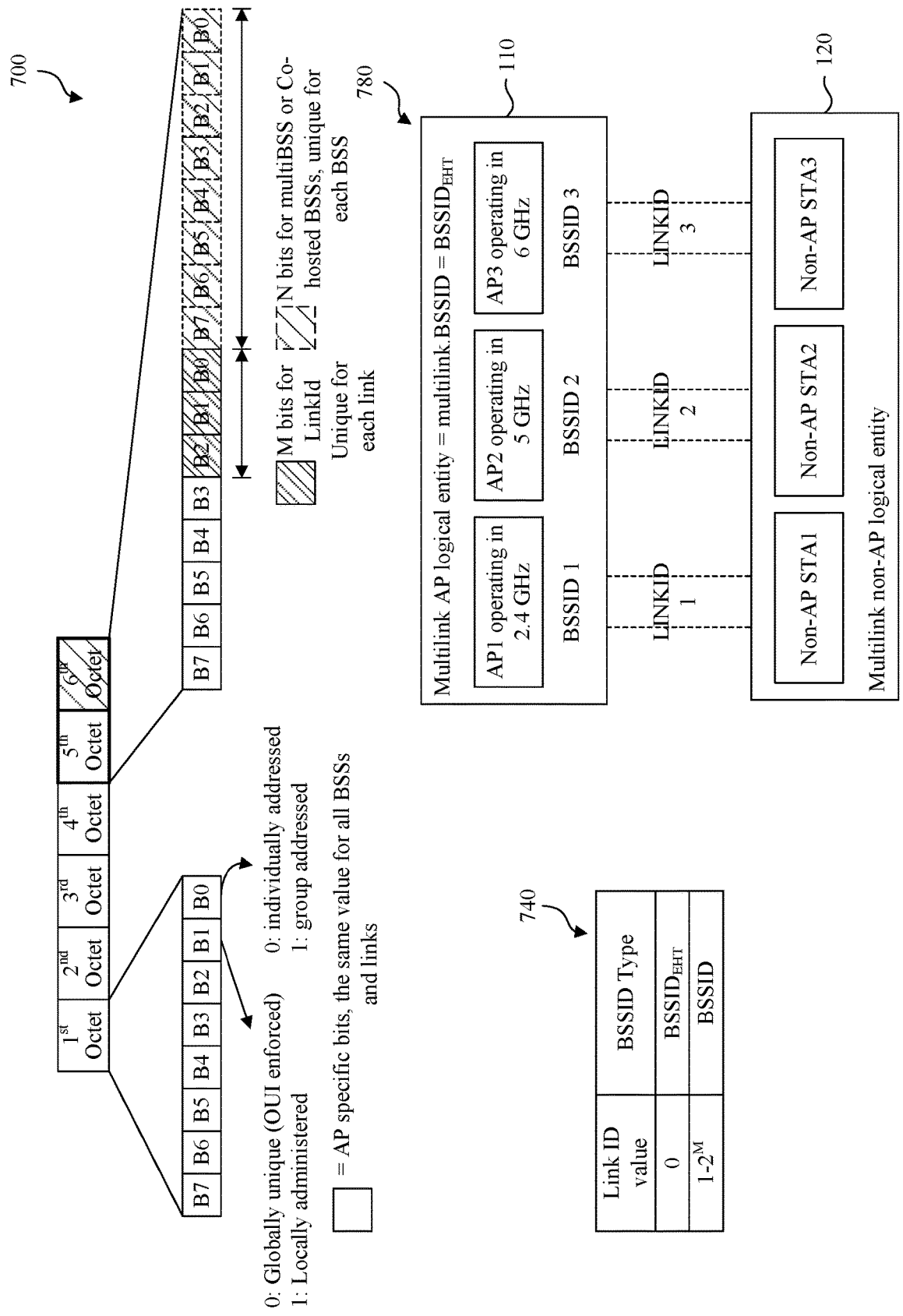
FIG. 7 illustrates a multilink BSSID structure for an EHT AP with many BSSs, a link identification table, and a corresponding block diagram in a multiple BSS environment according to some embodiments of the disclosure.

FIG. 7 illustrates BSSID structure 700, link identification table 740, and a corresponding block diagram 780 in a multiple BSS environment, in accordance with some embodiments of the disclosure. For explanation purposes and not a limitation, FIG. 7 may be described with elements from other figures in this disclosure. In some embodiments, a BSSID structure 700 can be used in EHT communications with a MLD AP (e.g., EHT AP 110) with multiple networks and improves on BSSID structure 680. Some embodiments include a LinkId that identifies a link of the multiple links in which an EHT AP operates, and the value of LinkId does not change based on the networks that utilize the links. For example, an EHT AP that identifies a LinkId=1 for the 5 GHz link will have a LinkId=1 for each link (e.g., channel) in the 5 GHz used by in each of the networks. Thus, the LinkId value is invariant with respect to the multiple networks in which the EHT AP operates. The LinkId can be used in conjunction with a BSS specific ID that separates the BSSs that the AP operates in the same channel to determine unique BSSID (e.g., link-specific BSSID) values that are compatible with co-hosting and multi-BSS operations as described in FIG. 6 above. That determination is illustrated in BSSID structure 700.

Bits within the 5$^{th}$ Octet and 6$^{th}$ octets make up a key identifier for BSSID structure 700: a prefix portion identifying the EHT AP that is the same for all networks of an EHT AP, a link identification portion that identifies a link in which the EHT AP is operating, and a network identification portion that uniquely identifies a BSS. As an example, the prefix portion includes 5 bits from the EHT AP MAC address. The narrow-stripe patterned M bits identify the LinkId, which is an EHT AP-specific value for a link of the multiple links in which the EHT AP operates. All the BSSs (e.g., networks) of the EHT AP using the same link (e.g., utilize the same primary channel) have the same value for these M bits, and M is an integer less than 3. The M bits for the LinkId are unique for each link within a network. The wide-stripe patterned N bits identify the network similar to the addressing used in co-hosted BSSs or multi-BSS, and the N bits are unique for each BSS. The networks that use different links have the same value for these N bits, and N is an integer less than 8. In some embodiments, the wide-stripe patterned N bits identify the $BSSID_{EHT}$. The other LinkId values range from 1 to 8 and they indicate that the BSSID type is different than $BSSID_{EHT}$.

As mentioned above, 5th Octet and 6th Octet make up a key identifier for BSSID structure 700. Thus, the combination of the prefix portion from the EHT AP MAC address, the M bits of the LinkId, and the N bits of the $BSSID_{EHT}$ together determine a unique BSSID value that is compatible with co-hosting and multi-BSS operations as described in FIG. 6 above. An example of how the LinkId affects the key identifier for BSSID structure 700 is described below and illustrated in block diagram 780 of one network (e.g., office network SSID1.)

When the M bits=000, the LinkId value is zero, and the BSSID type indicates unique value $BSSID_{EHT}$ (e.g., MLD MAC address such as multilink.BSSID) that identifies network SSID1. $BSSID_{EHT}$ is the same across each of the links, 2.4 GHz, 5 GHz, and 6 GHz as shown in block diagram 780. In some embodiments, the $BSSID_{EHT}$ can identify an EHT AP 110 (e.g., when there is only one network.)

When the M bits=001, the value of the LinkId is 1, and EHT AP identifies LinkId 1 as the 2.4 GHz link. The value of BSSID 1 includes the prefix portion from the EHT AP MAC address+001 of the LinkId, and the N bits of the BSS specific ID that separates the BSSs that the AP operates in the same channel. The BSSs in the same link will have the all bits the same, except the last N bits that are unique for each BSS.

When M bits=010, the value of the LinkId is 2, and EHT AP identifies LinkId 2 as the 5 GHz link. The value of BSSID 2 includes the prefix portion from the EHT AP MAC address+010 of the LinkId, and the N bits of the BSS specific ID that separates the BSSs that the AP operates in the same channel.

When M bits=011, the value of the LinkId is 3, and EHT AP identifies LinkId 3 as the 6 GHz link. The value of BSSID 3 includes the prefix portion from the EHT AP MAC address+011 of the LinkId, and the N bits of the BSS specific ID that separates the BSSs that the AP operates in the same channel.

Thus, the corresponding BSSID structure includes a key identifier that includes: the EHT AP prefix address portion, LinkID value, and the BSS specific identifier. EHT STA (e.g., EHT STA 120) uses the same BSS specific identifier in all links of a BSS. The LinkId identifies a link (e.g., frequency band) in which the EHT AP operates. For example, the LinkId may be used in a 4-way handshake, OMI+, etc. signaling to identify the links to which the signaling is applied (e.g., over which links an EHT STA can receive data in a post-association state.)

Non-AP EHT STA 120 that receives BSSID structure 700 can detect and utilize the LinkId to determine in real time, what links (e.g., frequency bands) are being utilized for that network where the network is identified by the N bits of the BSS specific ID that separates the BSSs that the AP operates in the same channel. For example, EHT STA 120 that receives from EHT AP 110, a BSSID structure 700, can identify EHT AP 110 from the first 5 bits of the $5^{th}$ Octet, determine that EHT AP 110 is operating in the 6 GHz frequency band based on the value of the M bits of the $5^{th}$ Octet that the LinkId=3, and from the N bits of the 6th Octet, the EHT network identifier for BSS 160 (e.g., the BSS specific identifier.)

In some embodiments, the $BSSID_{EHT}$ is created by masking the BSSID with a MASK. The MASK specifies the bits that are zeroed in order to derive the $BSSID_{EHT}$ address.

In some embodiments, the EHT AP may operate only a single BSS. In this case the EHT AP does not operate multi-BSS or co-hosted BSSs. In this case the BSSID has the EHT AP specific prefix, and the LinkId to specify the link in which the BSS operates. The LinkId may be located in the last bits of the $6^{th}$ Octet.

In some embodiments, both the EHT AP 110 and the non-AP EHT STA 120 may use the same MAC Address structure. For instance, the non-AP EHT STA 120 may have link-specific MAC address and the multilink MAC address. The multilink MAC address is derived from the link-specific MAC Address similarly as the $BSSID_{EHT}$ is derived from link-specific BSSID.

Figure 8:
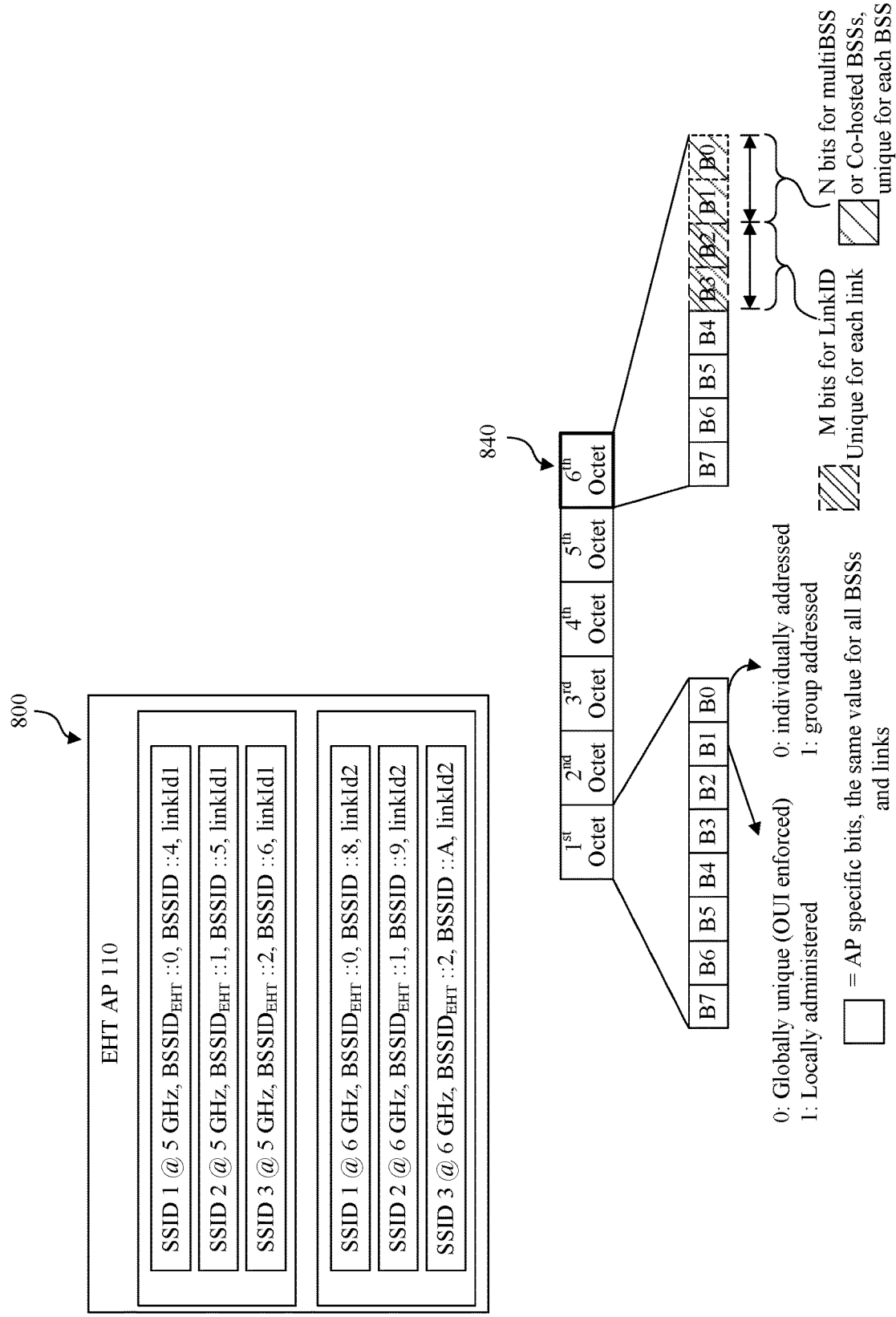
FIG. 8 illustrates an example of a multilink BSSID structure for an EHT AP with many BSSs, according to some embodiments of the disclosure.

FIG. 8 illustrates an example of an EHT AP with link identification in a multiple BSS environment, in accordance with some embodiments of the disclosure. For explanation purposes and not a limitation, FIG. 8 may be described with elements from other figures in the disclosure. Like AP 600 of FIG. 6, AP 800 has 3 networks and operates in two links, e.g., at 5 GHz and 6 GHz. Unlike AP 600, AP 800 (e.g., EHT AP 110) includes a $BSSID_{EHT}$ (e.g., multilink BSSID) value that is unique to each network. But within each network, the value of $BSSID_{EHT}$ is the same on the two links in which AP 800 operates. In addition, AP 800 includes a LinkId that identifies each link of the multiple links in which AP 800 operates. Note that the LinkId value is the same for each link, for each of the 3 networks.

Figure 9:
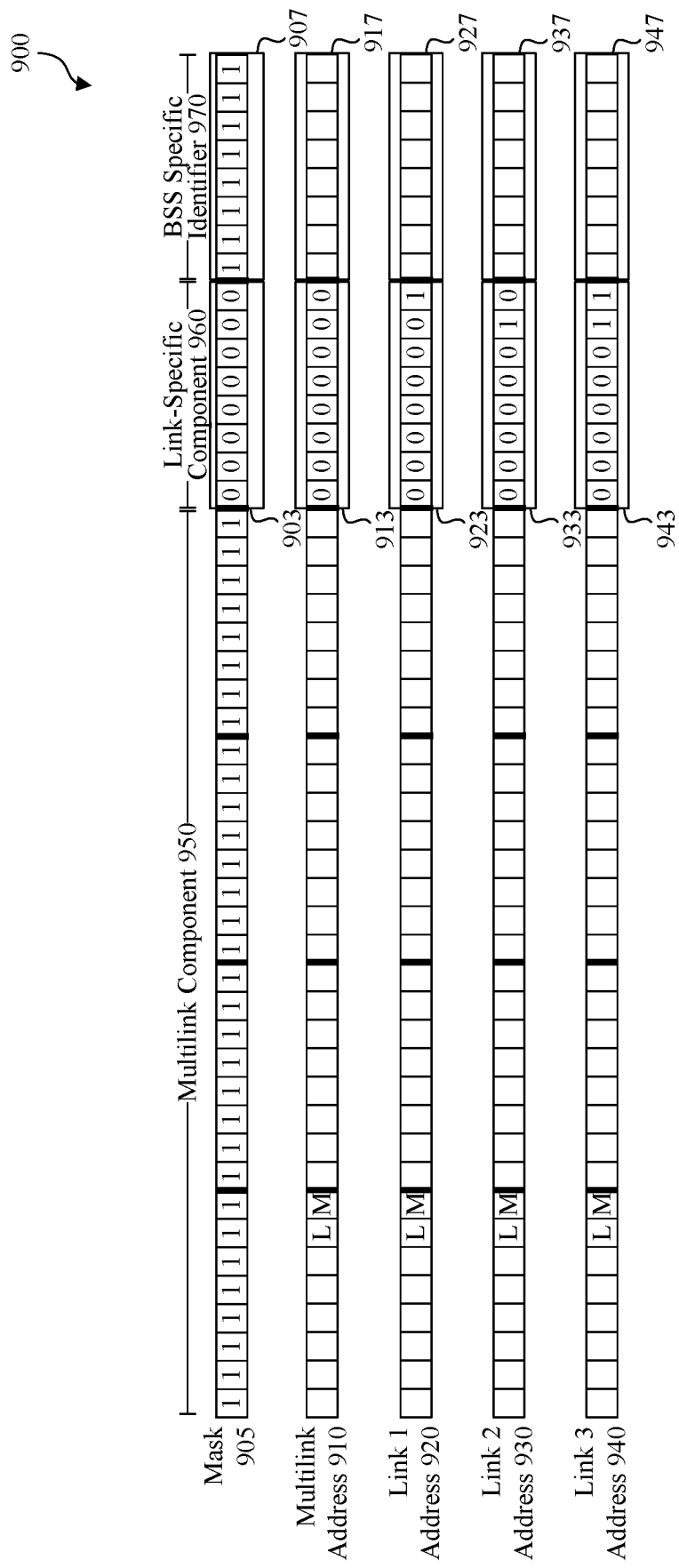
FIG. 9 illustrates an example of a derivable multilink MAC address structure, according to some embodiments of the disclosure.

FIG. 9 illustrates an example 900 of a derivable multilink MAC address structure, according to some embodiments of the disclosure. For explanation purposes and not a limitation, example 900 can be described with elements from other figures in the disclosure. For example, in some embodiments, a BSSID structure of example 900 can be used in EHT communications with a MLD AP (e.g., EHT AP 110) with multiple networks and improves on BSSID structure 680. In some embodiments, a multilink MAC address includes a multilink BSSID of an EHT AP or a multilink MAC address of an EHT STA, each of which can be derived from respective link-specific addresses. Thus, EHT AP 110 and non-AP EHT STA 120 may use link-specific addresses and a multilink mask in their communications (e.g., beacon, probe response, and association response information elements), and then derive multilink MAC addresses from the corresponding link-specific addresses. Example 900 includes: mask 905, multilink address 910, and link-specific addresses: link 1 address 920, link 2 address 930, and link 3 address 940. Each of the addresses include the following components: multilink component 950 that is common to all; link-specific component 960; and BSS specific identifier 970. BSS specific identifier 970 identifies the BSSs that EHT AP 110 operates, and EHT AP 110 can operate multiple BSSs. Mask 905 can identify what elements of MAC address are per-link or link-specific, and which are common across all links. For example, cleared bits (0) of link-specific component 903 mark the link-specific component of the address. Set bits (1) of multilink component 950 mark the portion of the address which is common to all links.

Mask 905, multilink address 910, and link-specific addresses: link1 address 920, link 2 address 930, and link 3 address 940 include corresponding link-specific components: 903, 913, 923, 933, and 943, as well as corresponding multilink components: 907, 917, 927, 937, 947. Link-specific component 960 can be interpreted as follows: All zero bits can indicate a virtual multilink MAC address (e.g., multilink BSSID or multilink MAC.) All one bits are reserved. The remaining values identify the specific link in use. Links can be numbered from 1 to N, starting with the lowest frequency channel assigned link 1, second lowest link 2, and so on. The derivation can be described in Equation 1 where the same multilink_Mask and link-specific numbering are used by both MLD devices, EHT AP 110 and non-AP EHT STA 120.

$$\text{multilink\_MACAddr} = \text{link\_MACAddr} \& \text{multilink\_Mask}, \quad \text{(Equation 1)}$$

Based on FIG. 3 for example, both the EHT AP 110 and the non-AP EHT STA 120 have link-specific addresses and a multilink address. A multilink BSSID (e.g., multilink.BSSID) can be derived from a mask (e.g., FF:FF:FF:FF:00:FF) and a link-specific BSSID (e.g., link1.BSSID, link2.BSSID, or link3.BSSID). And a multilink MAC address (e.g., multilink.MAC) can be derived from the same mask (e.g., FF:FF:FF:FF:00:FF) and a link-specific MAC address (link1.MAC, link2.MAC, or link3.MAC.) For example, EHT AP 110 includes the following APs and link-specific addresses: AP1 with link-specific BSSID, link1.BSSID with a structure of 6 octets with a value of 00:cc:cc:cc:01:cc; AP2 with link-specific BSSID, link2.BSSID with a structure of 6 octets with a value of 00:cc:cc:cc:02:cc; and AP3 with link-specific BSSID, link3.BSSID with a structure of 6 octets with a value of 00:cc:cc:cc:03:cc. Applying the mask value of FF:FF:FF:FF:00:FF to any of the link-specific BSSID values yields the multilink BSSID, multilink.BSSID, with a value of 00:cc:cc:cc:00:cc for EHT AP 110 with a structure of 6 octets.

For example, non-AP EHT STA 120 includes the following stations and link-specific addresses: STA1 with link-specific MAC address, link1.MAC with a structure of 6 octets with a value of 00:dd:dd:dd:01:dd; STA2 with link-specific MAC address, link2.MAC with a structure of 6 octets with a value of 00:dd:dd:dd:02:dd; and STA3 with link-specific MAC address, link3.MAC with a structure of 6 octets with a value of 00:dd:dd:dd:03:dd. Applying the mask value of FF:FF:FF:FF:00:FF to any of the link-specific MAC address values yields the multilink MAC address, multilink.MAC, with a value of 00:dd:dd:dd:00:dd for non-AP EHT STA 120 with a structure of 6 octets.

Accordingly, transmissions in a link can use a link-specific address to identify EHT AP 110, non-AP EHT STA 120, and respective multilink MAC addresses (e.g., multilink BSSID, multilink MAC address.) The EHT capable receiver of the transmission uses masks, or sets the link-specific component 960 bits of the address to 0 to derive the multilink MAC address from the link-specific address, or the receiver uses a rule to map all link-specific addresses to a specific multilink MAC address that they use. Using link-specific addresses to derive a single MAC address in both EHT AP 110 (e.g., multilink BSSID) and non-AP EHT STA 120 (e.g., multilink MAC) allows the use of a single sequence number space for transmitted MPDUs and setup of a single block ACK (BA) scheme per TID (e.g., traffic identifier.) The links that have a different sequence number for transmitted MPDUs are not mapped to the multilink MAC address. When a link-specific MAC address is in use, the information of the link that carried is visible from the MAC header. This enables link adaptation, for example, because the link-specific information of the link that carried the MPDU is available in the MAC header.

When data is transmitted by using link-specific MAC addresses, EHT AP 110 and non-AP EHT STA 120 do not need to signal their EHT MAC Address of $BSSID_{EHT}$ (e.g., multilink BSSID) or multilink MAC address) to other devices. For instance, a multilink MAC address may be used in authentication and 4-way handshake. In an embodiment, both EHT AP 110 and non-AP EHT STA 120 use link-specific MAC addresses in each link and include the link-specific MAC addresses in MAC headers (e.g., RA, TA, BSSID, etc.) As described above, when receiving a frame that includes link-specific MAC addresses, EHT AP 110 and non-AP EHT STA 120 can use mask 905, LinkID, or address mapping to derive or find the corresponding multilink address.

In addition to utilizing mask 905 and LinkID approaches, the multilink address can also be selected to be a new MAC address that cannot be directly derived from the corresponding link-specific MAC address. In this case, EHT AP 110 and non-AP EHT STA 120 need to maintain an address mapping table to find a multilink MAC address based on a received link-specific MAC address. For example, non-AP EHT STA 120 may change the link-specific MAC address periodically for privacy protection, but keep the multilink MAC address unchanged. In addition, non-AP EHT STA 120 can provide the multilink MAC address to a peer non-AP EHT STA 120 in encrypted format during a 4-Way Handshake, or use protected management frames so that the multilink MAC address is not exposed to other stations in the vicinity (e.g., neighborhood.) In some examples, single block acknowledgement setup, sequence number space, packet number space, and/or security keys are associated with multilink addresses between EHT AP 110 and non-AP EHT STA 120 pair, rather than specific links. A single authentication and association can be performed for all links.

Figure 14A:
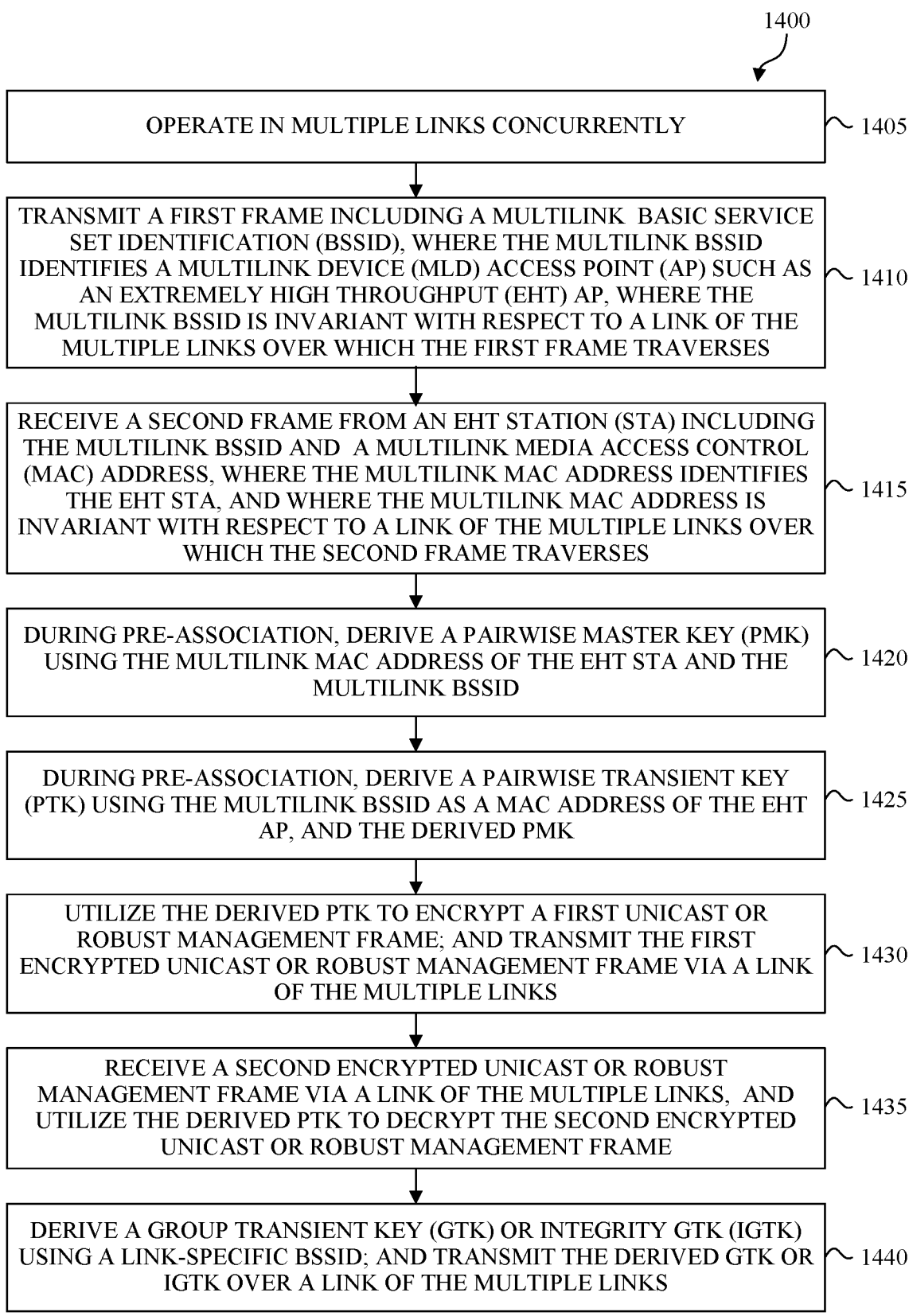
FIGS. 14A and 14B illustrate example methods for a MLD AP (e.g., EHT AP), according to some embodiments of the disclosure.
Figure 14B:
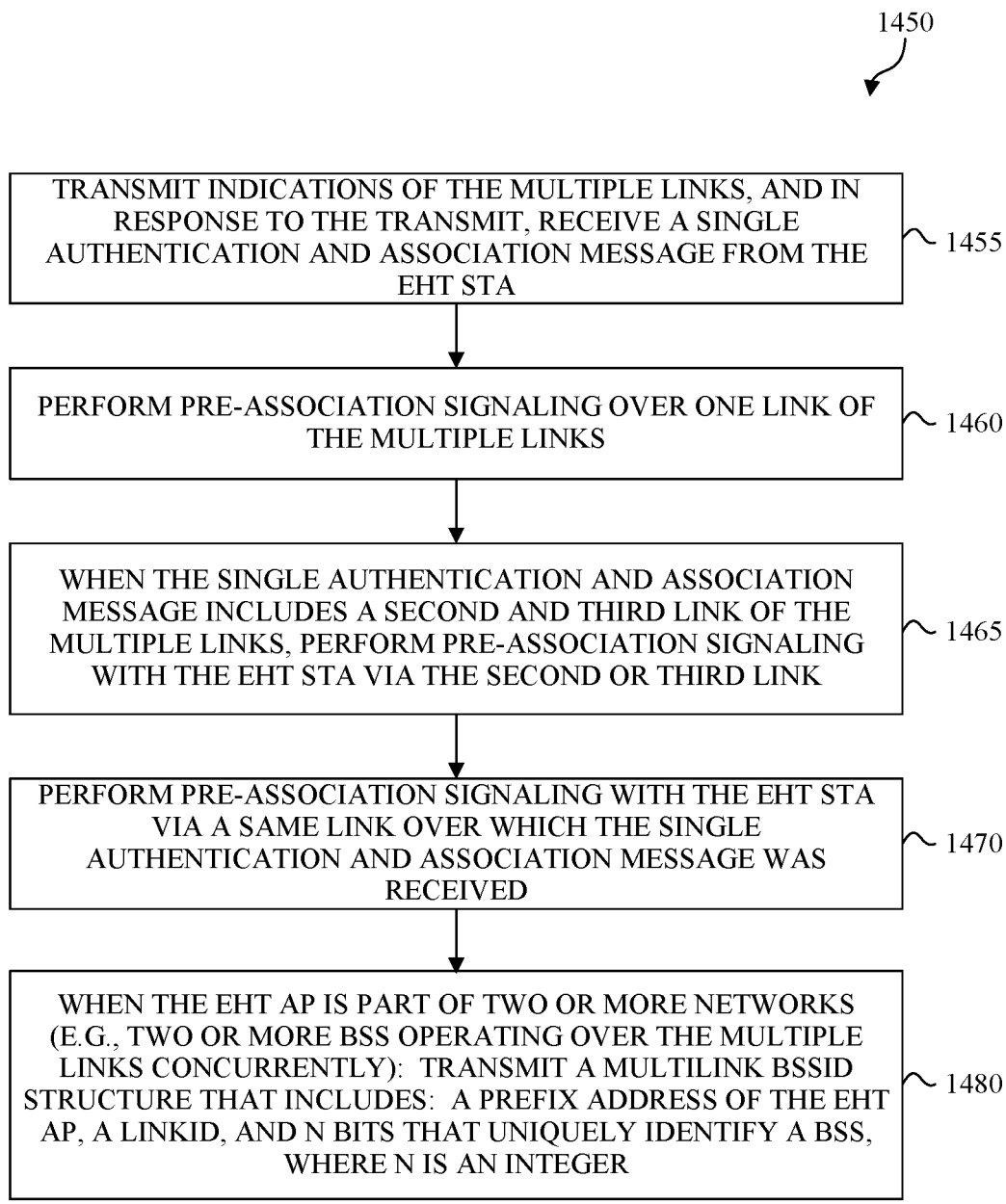

FIGS. 14A and 14B illustrate example methods 1400 and 1450 for a MLD AP such as an EHT AP, according to some embodiments of the disclosure. For explanation purposes, FIGS. 14A and 14B may be described with elements from other figures in the disclosure.

At 1405, EHT AP (e.g., EHT AP 110) operates in multiple links. In some embodiments the EHT AP may operate in multiple links concurrently.

At 1410, EHT AP transmits a first frame including a multilink MAC address such as an EHT $BSSID_{EHT}$ that can be a multilink BSSID. The multilink BSSID identifies an EHT AP (e.g., EHT AP 110) where the multilink BSSID is invariant with respect to a link of the multiple links over which the first frame is transmitted. For example, the multilink BSSID does not change if a same or different link of the multiple links is used to transmit the first frame.

At 1415, EHT AP receives a second frame from a MLD STA such as an EHT STA (e.g., non-AP EHT STA 120) including the multilink BSSID and a multimedia MAC address, where the multilink MAC address identifies the EHT STA, and where the multilink MAC address is invariant with respect to a link of the multiple links over which the second frame is received.

At 1420, during pre-association, EHT AP derives a pairwise master key (PMK) using the multilink MAC address of the EHT STA and the multilink BSSID.

At 1425, during pre-association, EHT AP derives a pairwise transient key (PTK) using the multilink BSSID as a MAC address of the EHT AP, and the derived PMK.

At 1430, EHT AP utilizes the derived PTK to encrypt a unicast or robust management frame, and transmits the encrypted unicast or robust management frame via a link of the multiple links.

At 1435, EHT AP receives an encrypted unicast or robust management frame via a link of the multiple links, and utilizes the derived PTK to decrypt the encrypted unicast or robust management frame.

At 1440, EHT AP derives or assigns $BSSID_{EHT}$ a group transient key (GTK) or integrity GTK (iGTK) using the multilink BSSID; and transmits the derived GTK or iGTK over a link of the multiple links. In some embodiments, EHT AP derives the GTK and/or iGTK using a link-specific BSSID, and transmits the derived GTK or iGTK over a link of the multiple links.

FIG. 14B illustrates method 1450 for an EHT AP, according to some embodiments of the disclosure. Method 1450 can be a continuation of method 1400.

At 1455, EHT AP transmits indications of the multiple links, and in response to the indications transmitted, receives a single authentication and association message from the EHT STA.

At 1460, EHT AP performs pre-association signaling (e.g., transmit and receive pre-association signaling) over one link of the multiple links.

At 1465, in an example, when the single authentication and association message includes a second and third link of the multiple links, EHT AP performs pre-association signaling with the first EHT STA via the second or third link.

At 1470, in an example, EHT AP performs pre-association signaling with the first EHT STA via a same link over which the single authentication and association message was received.

At 1480, when the EHT AP has two or more networks (e.g., two or more BSSs operating over the multiple links), the EHT AP: transmits a multilink BSSID structure that includes: a prefix address of the EHT AP, and a LinkId and N bits that uniquely identify a BSS, where N is an integer. If the BSS is part of co-hosted or multi-BSS, then the remainder of the BSSID structure identifies the BSS with a unique value of the BSS. For example, a beacon transmitter address has LinkId set to identify the link in which the beacon is transmitted, the beacon has one BSS as the transmit address. If the AP operates several BSSs in Multi-BSS or in co-hosted BSS type, then the last part of the address identifies the specific BSS.

In some embodiments, the multilink BSSID may not be directly present in beacon, but the beacon may carry a parameter used to derive the multilink BSSID. For example, the beacon or probe response can include a link-specific BSSID and link identifier bits used for LinkId. Setting the LinkId bits to 0 creates the multilink BSSID.

Figure 15A:
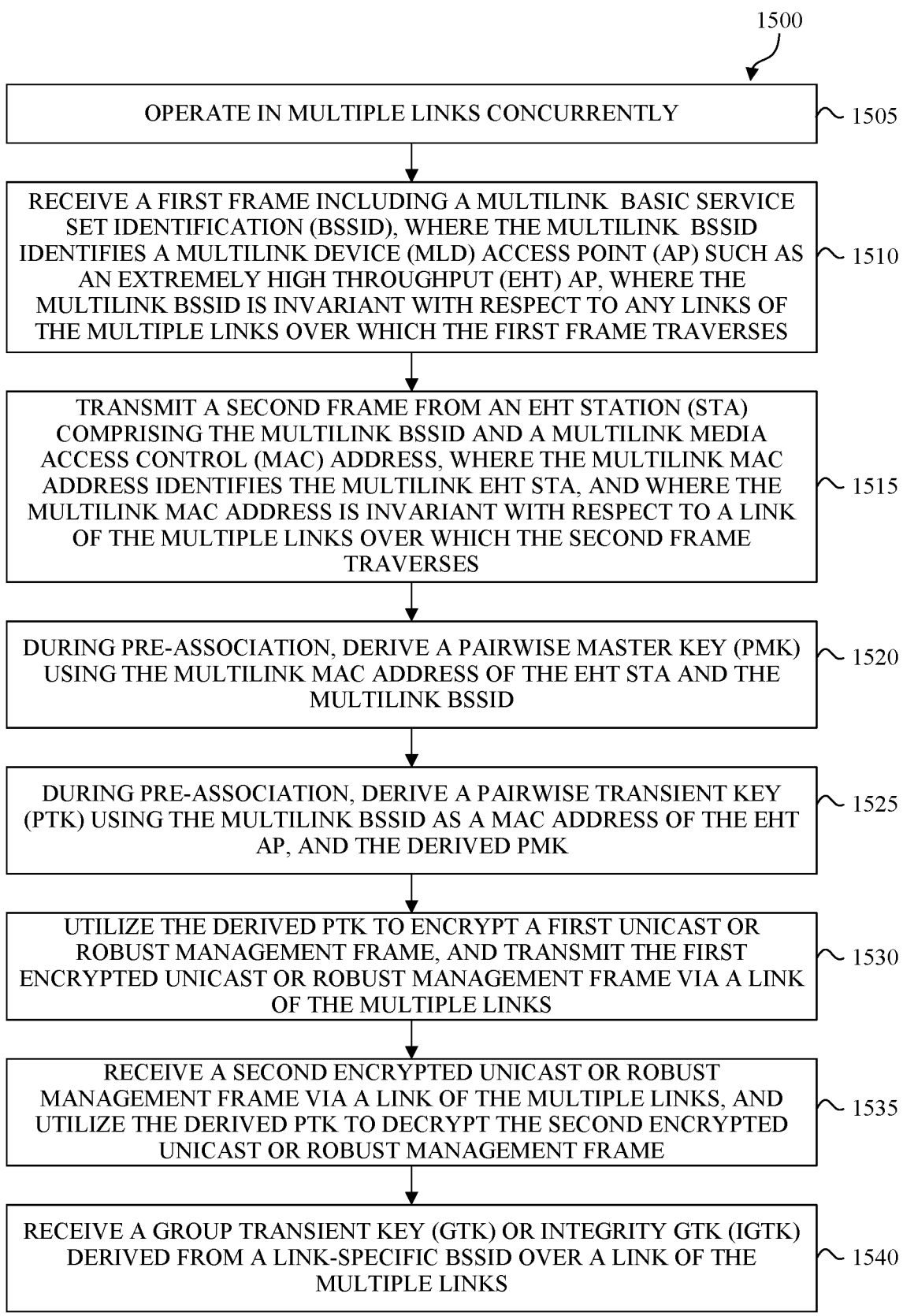
FIGS. 15A and 15B illustrate example methods for a MLD station (e.g., EHT STA), according to some embodiments of the disclosure.
Figure 15B:
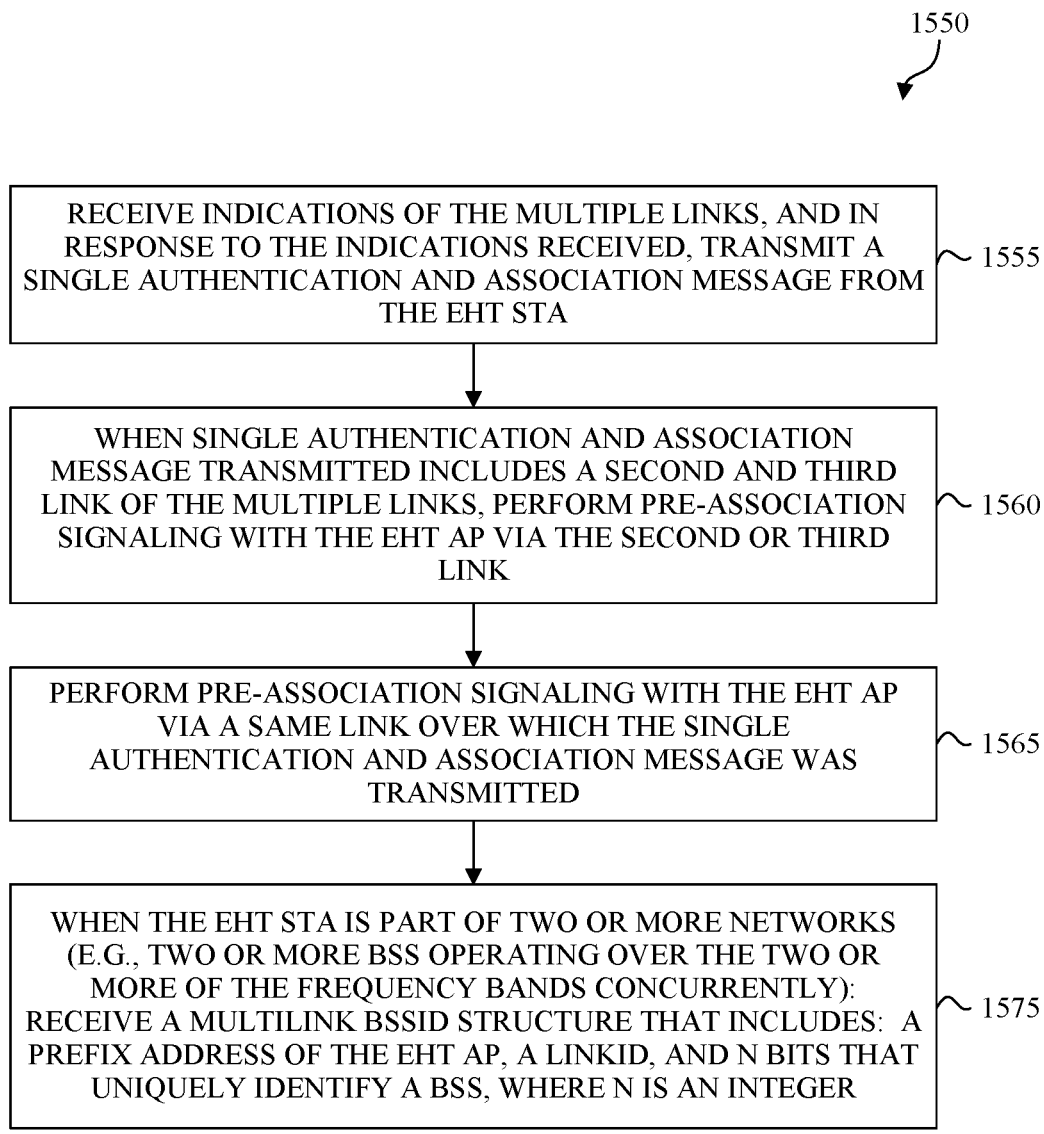

FIGS. 15A and 15B illustrate an example methods 1500 and 1550 for a MLD STA such as an EHT STA (e.g., non-AP EHT STA 120), according to some embodiments of the disclosure. For explanation purposes and not a limitation, FIGS. 15A and 15B may be described with elements from other figures in the disclosure.

At 1505, EHT STA operates in multiple links. In some embodiments, the EHT STA may operate in multiple links concurrently.

At 1510, EHT STA receives a first frame including a multilink BSSID such as an EHT BSSID, where the multilink BSSID identifies a MAC address of an EHT AP (e.g., EHT AP 110), where the multilink BSSID is invariant with respect to any links of the multiple links over which the first frame is received.

In some embodiments a non-associated EHT STA may receive other than a multilink BSSID. For example, the non-associated EHA STA can receive a beacon or probe response that includes a link-specific BSSID in the first frame. The information elements of the first frame allow the EHT STA to derive the multilink BSSID from the link-specific BSSID. For example, certain fields in the link-specific BSSID structure in the MAC header can be set to a different value (e.g., all zeros) to obtain the multilink BSSID.

At 1515, EHT STA transmits a second frame including the multilink BSSID and a multilink MAC address, where the multilink MAC address identifies the EHT STA, and where the multilink MAC address is invariant with respect to a link of the multiple links over which the second frame is transmitted.

At 1520, during pre-association, EHT STA derives a pairwise master key (PMK) using the multilink MAC address of the EHT STA and the multilink BSSID. In some embodiments EHT STA uses a link-specific BSSID to identify the EHT AP and derive a PMK. In some embodiments, an EHT STA can have multiple MAC addresses and select one of the MAC addresses to derive the PMK.

At 1525, during pre-association, EHT STA derives a pairwise transient key (PTK) using the multilink BSSID as a MAC address of the EHT AP, and the derived PMK.

At 1530, EHT STA utilizes the derived PTK to encrypt a unicast or robust management frame, and transmit the encrypted unicast or robust management frame via a link of the multiple links.

At 1535, EHT STA receives an encrypted unicast or robust management frame via a link of the multiple links, and utilizes the derived PTK to decrypt the encrypted unicast or robust management frame At 1540, EHT STA receives a group transient key (GTK) or integrity GTK (iGTK) derived from the multilink BSSID over a link of the multiple links. In some embodiments, EHT STA receives a GTK or iGTK derived from a link-specific BSSID over a link of the multiple links.

FIG. 15B illustrates an example method for an EHT STA, according to some embodiments of the disclosure. Method 1550 can be a continuation of method 1500.

At 1555, EHT STA receives indications of the multiple links, and in response to the indications received, transmits a single authentication and association message from the EHT STA to the EHT AP. Subsequent alternatives include 1560, 1565, and 1570 described below.

At 1560, when the indications of the multiple links include a second and third link of the multiple links, EHT STA performs pre-association signaling with the EHT AP via the second or third link.

At 1565, EHT STA performs pre-association signaling with the first EHT AP via a same link over which the indications of the multiple links was received. In some embodiments, EHT STA transmits an association request frame that indicates: the EHT STA's capabilities to operate in different bands; EHT STA communicates its MAC addresses that used for different links, (e.g., selects the links in which the EHT STA desires to operate); the STA can communicate the same MAC address if the EHT STA desires to use the same sequence number and BA sessions; and an other link (which may include a plurality of links) of the multiple links over which the first EHT STA is to receive data during a post-association state, where the other link can be: a) the same as a link of the one or more links over which the single authentication and association message was transmitted; or different than a link of the multiple links over which the single authentication and association message was transmitted.

At 1575, when the EHT STA is part of a network that operates in a plurality of links, the EHT STA receives a multilink BSSID that includes: a prefix address of the EHT AP, a LinkId, and N bits that uniquely identify a BSS, where N is an integer.

In accordance with various embodiments described herein, the terms EHT STA and legacy STA may refer to a wireless communication device, wireless device, mobile device, mobile station, and user equipment (UE), and may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or fifth generation (5G) or other present or future developed advanced cellular wireless networks.

The embodiments discussed above with reference to FIGS. 1-13, 14A, 14B, 15A, and 15B can be applied to a transmitter address (TA) to identify receivers of a trigger frame. For example, if EHT AP 110 operates multiple BSSs in multiple channels, then EHT AP 110 can use different BSSs as transmit BSSs. The transmit BSS is discovered faster by scanning EHT STAs 120 because the transmit BSS information is present in beacon and probe response frames. If EHT AP 110 has multiple Transmit BSSs, then Transmit AddressEHT (e.g., $BSSID_{EHT}$ or multilink BSSID) may be used as TA to indicate that all associated EHT STAs 120 in any link receives the trigger frame with RA set to a broadcast address. For instance, the broadcast address may have the prefix part to identify EHT AP 110 and the linkID set to common values and the last N bits set to 1.

Figure 16:
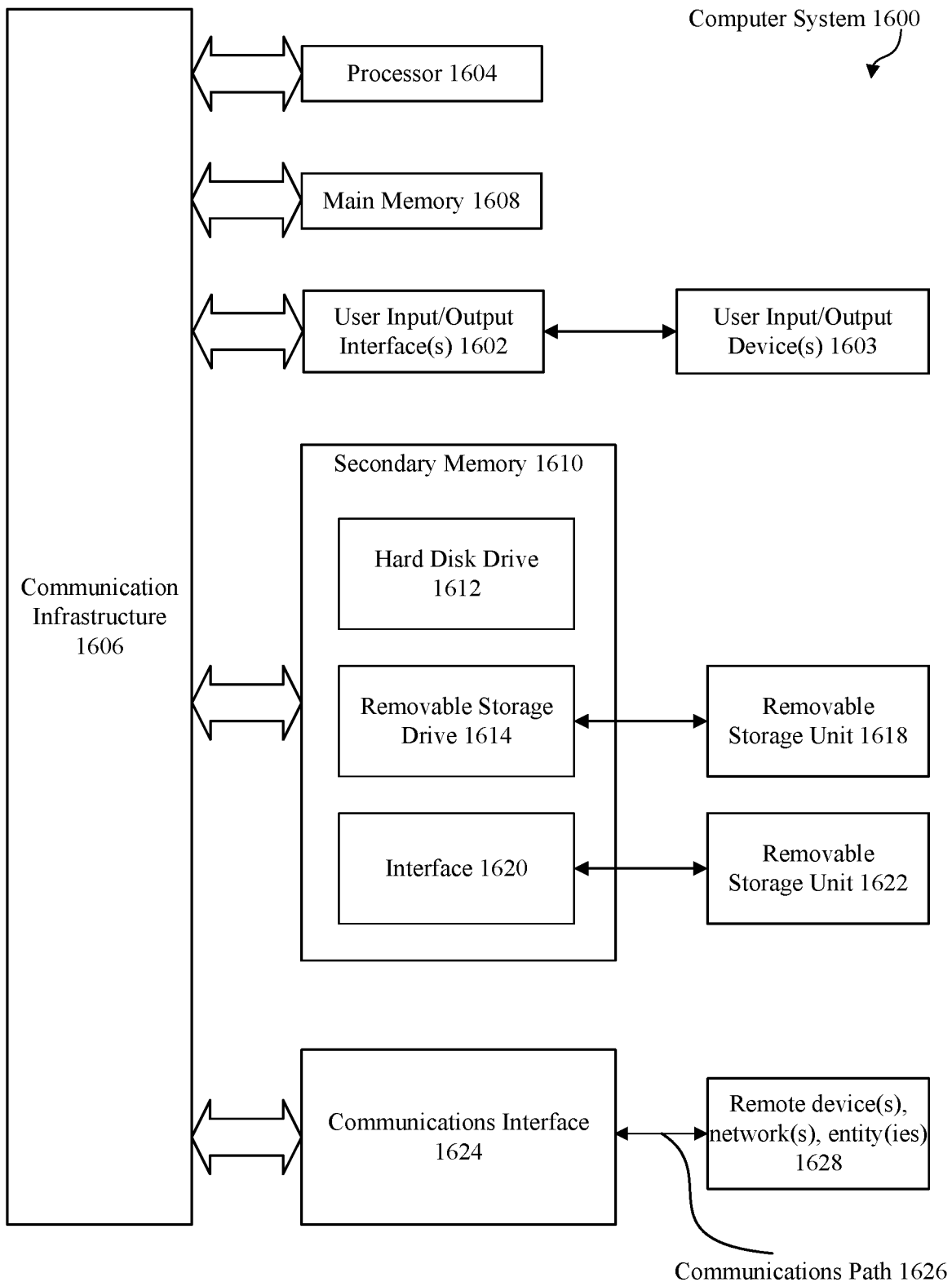
FIG. 16 shows an example computer system for implementing some embodiments or portion(s) thereof.

Various embodiments can be implemented, for example, using one or more computer systems, such as computer system 1600 shown in FIG. 16. Computer system 1600 can be any well-known computer capable of performing the functions described herein. For example, and without limitation, electronic devices such as EHT AP 110, EHT STA 120, legacy STA 140, can be smart phones, cellular devices, laptops, desktops as described with regard to FIG. 1 and/or other apparatuses and/or components shown in the figures which can be performed by computer system 1600. For example, computer system 1600 can be used in wireless devices to perform the methods and functions as described in FIGS. 2-13, 14A, 14B, 15A, and 15B.

Computer system 1600 includes one or more processors (also called central processing units, or CPUs), such as a processor 1604. Processor 1604 is connected to a communication infrastructure 1606 such as a bus. Computer system 1600 also includes user input/output device(s) 1603, such as monitors, keyboards, pointing devices, etc., that communicate with communication infrastructure 1606 through user input/output interface(s) 1602. Computer system 1600 also includes a main or primary memory 1608, such as random access memory (RAM). Main memory 1608 may include one or more levels of cache. Main memory 1608 has stored therein control logic (e.g., computer software) and/or data.

Computer system 1600 may also include one or more secondary storage devices or memory 1610. Secondary memory 1610 may include, for example, a hard disk drive 1612 and/or a removable storage device or drive 1614. Removable storage drive 1614 may be a floppy disk drive, a magnetic tape drive, a compact disk drive, an optical storage device, tape backup device, and/or any other storage device/drive.

Removable storage drive 1614 may interact with a removable storage unit 1618. Removable storage unit 1618 includes a computer usable or readable storage device having stored thereon computer software (control logic) and/or data. Removable storage unit 1618 may be a floppy disk, magnetic tape, compact disk, DVD, optical storage disk, and/any other computer data storage device. Removable storage drive 1614 reads from and/or writes to removable storage unit 1618 in a well-known manner.

According to some embodiments, secondary memory 1610 may include other means, instrumentalities or other approaches for allowing computer programs and/or other instructions and/or data to be accessed by computer system 1600. Such means, instrumentalities or other approaches may include, for example, a removable storage unit 1622 and an interface 1620. Examples of the removable storage unit 1622 and the interface 1620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1600 may further include a communication or network interface 1624. Communication interface 1624 enables computer system 1600 to communicate and interact with any combination of remote devices, remote networks, remote entities, etc. (individually and collectively referenced by reference number 1628). For example, communication interface 1624 may allow computer system 1600 to communicate with remote devices 1628 over communications path 1626, which may be wired and/or wireless, and which may include any combination of LANs, WANs, the Internet, etc. Control logic and/or data may be transmitted to and from computer system 1600 via communication path 1626. In some embodiments, communications interface 1624 may include one or more transceivers that can be coupled to one or more antennas.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1600, main memory 1608, secondary memory 1610 and removable storage units 1618 and 1622, as well as tangible articles of manufacture embodying any combination of the foregoing. Such control logic, when executed by one or more data processing devices (such as computer system 1600), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 16. In particular, embodiments may operate with software, hardware, and/or operating system implementations other than those described herein.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A multilink device (MLD) access point (AP), comprising:
   one or more transceivers configured to transmit and receive extremely high throughput (EHT) wireless communications over multiple links; and
   a processor, coupled to the one or more transceivers, configured to:
      transmit, via a first transceiver of the one or more transceivers using a first link of the multiple links, a beacon comprising: i) a multilink basic service set (BSS) identification (BSSID), wherein the multilink BSSID identifies an MLD media access control (MAC) address of the MLD AP, and the multilink BSSID remains the same regardless of which link of the multiple links is used for the transmission; and ii) a first link-specific BSSID corresponding to the first link of the multiple links; and
      receive from an MLD station (STA), via a transceiver of the one or more transceivers using one link of the multiple links, a first frame comprising a multilink MAC address that identifies the MLD STA, wherein the multilink MAC address remains the same regardless of which link of the multiple links is used for the reception of the first frame.

2. The MLD AP of claim 1, wherein the processor is further configured to:
   receive, via the first transceiver of the one or more transceivers, a second frame comprising the first link-specific BSSID and a particular MAC address, wherein the particular MAC address identifies a legacy STA operating on the first link.

3. The MLD AP of claim 1, wherein the processor is further configured to: during pre-association, derive a pairwise master key (PMK) using the multilink MAC address of the MLD STA and the multilink BSSID.

4. The MLD AP of claim 3, wherein the processor is further configured to: during a 4-way handshake, derive a pairwise transient key (PTK) using the multilink BSSID as the MLD MAC address of the MLD AP, and the derived PMK.

5. The MLD AP of claim 4, wherein the processor is further configured to:
utilize the derived PTK to encrypt a unicast or robust management frame; and
transmit, via the one or more transceivers, the encrypted unicast or robust management frame via a link of the multiple links.

6. The MLD AP of claim 4, wherein the processor is further configured to:
receive, via the one or more transceivers, an encrypted unicast or robust management frame via a link of the multiple links; and
utilize the derived PTK to decrypt the encrypted unicast or robust management frame.

7. The MLD AP of claim 1, wherein the processor is further configured to:
derive a group transient key (GTK) or integrity GTK (iGTK) using a link-specific BSSID; and
transmit, via the one or more transceivers, the derived GTK or iGTK over a link of the multiple links.

8. The MLD AP of claim 1, wherein the processor is further configured to:
transmit, via the one or more transceivers, indications of the multiple links; and
in response to the transmission, receive, via the one or more transceivers, a single authentication and association message from the MLD STA.

9. The MLD AP of claim 8, wherein the processor is further configured to: perform pre-association signaling over a second link of the multiple links.

10. The MLD AP of claim 8, wherein the processor is configured to: perform pre-association signaling with the MLD STA via a same link over which the single authentication and association message is received.

11. The MLD AP of claim 8, wherein the processor is further configured to:
receive, via the one or more transceivers, an association request frame that indicates a second link of the multiple links over which the MLD STA receives data during a post-association state.

12. A multilink device (MLD) station (STA), comprising:
one or more transceivers configured to transmit and receive extremely high throughput (EHT) wireless communications over multiple links; and
a processor, coupled to the one or more transceivers, configured to:
receive from an MLD access point (AP), via a first transceiver of the one or more transceivers using a first link of the multiple links, a beacon comprising:
i) a multilink basic service set (BSS) identification (BSSID), wherein the multilink BSSID identifies an MLD media access control (MAC) address of the MLD AP and the multilink BSSID remains the same regardless of which link of the multiple links is used for the reception; and ii) a first link-specific BSSID corresponding to the first link of the multiple links; and
transmit, via a transceiver of the one or more transceivers using one link of the multiple links, a first frame comprising a multilink MAC address that identifies the MLD STA, wherein the multilink MAC address remains the same regardless of which link of the multiple links is used for the transmission of the first frame.

13. The MLD STA of claim 12, wherein the processor is further configured to: during pre-association, derive a pairwise master key (PMK) using the multilink MAC address of the MLD STA and the multilink BSSID.

14. The MLD STA of claim 13, wherein the processor is further configured to: during a 4-way handshake, derive a pairwise transient key (PTK) using the multilink MAC address as the MLD MAC address of the MLD STA, and the derived PMK.

15. A method for a multilink device (MLD) access point (AP), comprising:
transmitting via a first link of multiple links, a beacon comprising a multilink basic service set (BSS) identification (BSSID), wherein the multilink BSSID identifies an MLD media access control (MAC) address of the MLD AP and the multilink BSSID remains the same regardless of which link of the multiple links is used for transmitting the beacon; and
receiving via one link of the multiple links, a first frame comprising a multilink MAC address that identifies an MLD station (STA), wherein the multilink MAC address remains the same regardless of which link of the multiple links is used for receiving the first frame.

16. The method of claim 15, further comprising:
receiving a second frame comprising a first link-specific BSSID corresponding to the first link and a particular MAC address, wherein the particular MAC address identifies a legacy STA operating on the first link.

17. The method of claim 15, further comprising: during pre-association, deriving a pairwise master key (PMK) using the multilink MAC address of the MLD STA and the multilink BSSID.

18. The method of claim 17, further comprising: during a 4-way handshake, deriving a pairwise transient key (PTK) using the multilink BSSID as the MLD MAC address of the MLD AP, and the derived PMK.

19. The method of claim 15, further comprising:
deriving a group transient key (GTK) or integrity GTK (iGTK) using a link-specific BSSID corresponding to a link of the multiple links; and
transmitting the derived GTK or iGTK over the link.

20. The method of claim 19, further comprising:
transmitting indications of the multiple links, and
in response to the transmitting, receiving a single authentication and association message from the MLD STA.

* * * * *